US011428938B2

(12) United States Patent
Yaroshchuk et al.

(10) Patent No.: US 11,428,938 B2
(45) Date of Patent: Aug. 30, 2022

(54) SWITCHABLE DIFFRACTIVE OPTICAL ELEMENT AND WAVEGUIDE CONTAINING THE SAME

(71) Applicant: Meta Platforms Technologies, LLC, Menlo Park, CA (US)

(72) Inventors: Oleg Yaroshchuk, Menlo Park, CA (US); Giuseppe Calafiore, Menlo Park, CA (US); Alireza Moheghi, Menlo Park, CA (US); Andrew Maimone, Menlo Park, CA (US); Barry David Silverstein, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 232 days.

(21) Appl. No.: 16/726,130

(22) Filed: Dec. 23, 2019

(65) Prior Publication Data
US 2021/0191122 A1 Jun. 24, 2021

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0076* (2013.01);
(Continued)

(58) Field of Classification Search
CPC ............ G02B 27/0172; G02B 27/0081; G02B 27/4205; G02B 2027/0112;
(Continued)

(56) References Cited

U.S. PATENT DOCUMENTS 10,527,855 B2 * 1/2020 Alexander ............ G02F 1/1326
11,092,806 B2 * 8/2021 Lee .................... G02B 27/0101
(Continued)

FOREIGN PATENT DOCUMENTS

WO 2019/178060 A1 9/2019

OTHER PUBLICATIONS

International Search Report and Written Opinion dated Feb. 24, 2021, in International Application No. PCT/US2020/062991, filed on Dec. 3, 2020 (9 pages).
J. Chou, et al., "Electrically switchable diffractive waveplates with metasurface aligned liquid crystals," Optics Express, vol. 24, No. 21, Oct. 17, 2016, pp. 24265-24273 (9 pages).
(Continued)

*Primary Examiner* — Collin X Beatty
(74) *Attorney, Agent, or Firm* — Millburn IP PLLC

(57) ABSTRACT

An optical device includes a light source assembly configured to generate an image light; and at least one waveguide including an in-coupling element and an out-coupling element configured to transmit, via the at least one waveguide, a plurality of light fields of the image light to an eye-box of the optical device, in a time-multiplexing manner. At least one of the in-coupling element or the out-coupling element includes at least one switchable diffractive optical grating, which includes a surface relief grating (SRG) filled with an optically anisotropic material having a first principal refractive index along a groove direction of the SRG and a second principal refractive index along an in-plane direction perpendicular to the groove direction. One of the first and second refractive principal refractive indices substantially matches a refractive index of the SRG, and the other mismatches.

19 Claims, 23 Drawing Sheets

(51) Int. Cl.
*G02B 6/34* (2006.01)
*G02B 27/00* (2006.01)
*G02B 27/42* (2006.01)

(52) U.S. Cl.
CPC ........... *G02B 6/34* (2013.01); *G02B 27/0081* (2013.01); *G02B 27/4205* (2013.01); *G02B 2027/0112* (2013.01); *G02B 2027/0125* (2013.01); *G02B 2027/0178* (2013.01)

(58) Field of Classification Search
CPC .... G02B 2027/0125; G02B 2027/0178; G02B 6/0016; G02B 6/0076; G02B 6/34
USPC ......................................................... 359/567
See application file for complete search history.

(56) References Cited

U.S. PATENT DOCUMENTS

| | | | |
|---|---|---|---|
| 2007/0070504 A1* | 3/2007 | Akutsu | G02B 5/32 359/566 |
| 2017/0307887 A1 | 10/2017 | Stenberg et al. | |
| 2018/0252857 A1 | 9/2018 | Glik et al. | |
| 2020/0183163 A1* | 6/2020 | Waldern | G02B 27/0172 |

OTHER PUBLICATIONS

Yin, K., et al., "Stretchable, flexible, rollable, and adherable polarization volume grating film," Optics Express, vol. 27, No. 4, Feb. 18, 2019, pp. 5814-5823 (10 pages).

Waldern, J.D., et al., "DigiLens switchable Bragg grating waveguide optics for augmented reality applications," Proceedings of SPIE, vol. 10676, Digital Optics for Immersive Displays, 106760G-1 to 106760G-16, May 21, 2018 (16 pages).

* cited by examiner

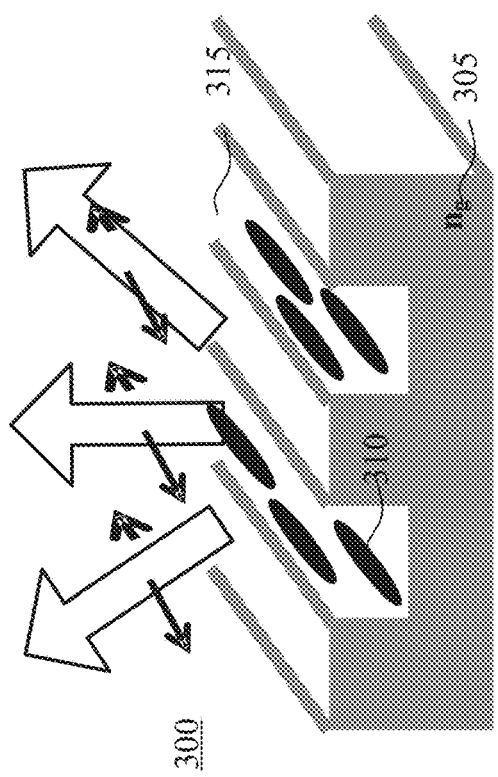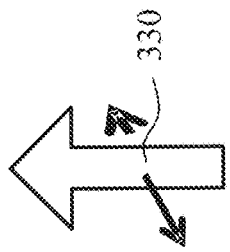
FIG. 3A
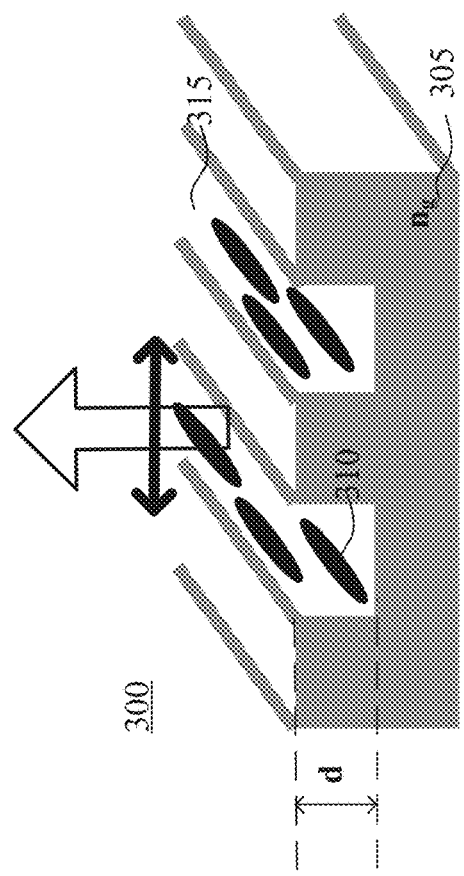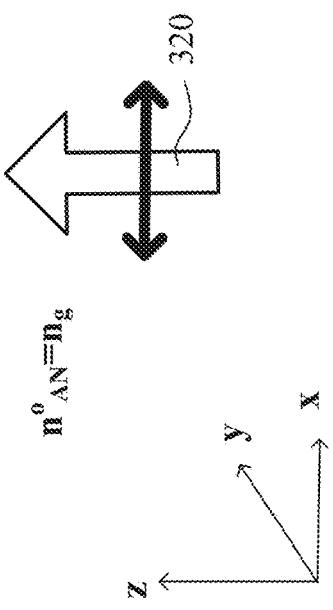
FIG. 3B

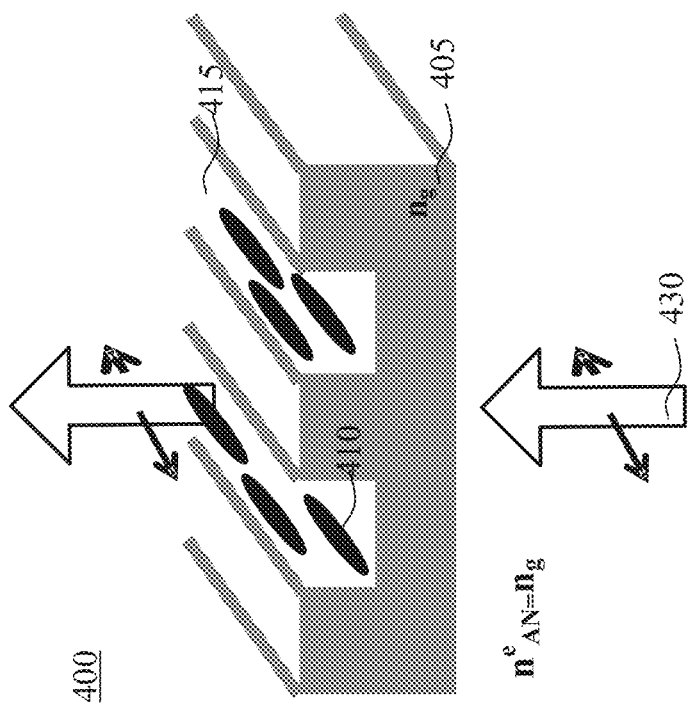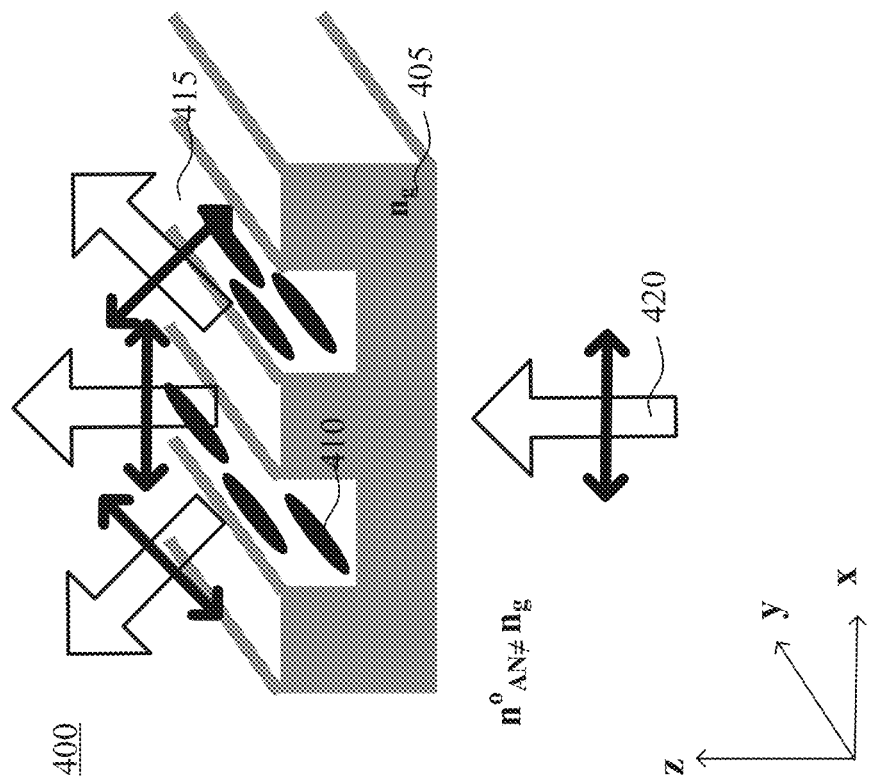
FIG. 4A
FIG. 4B

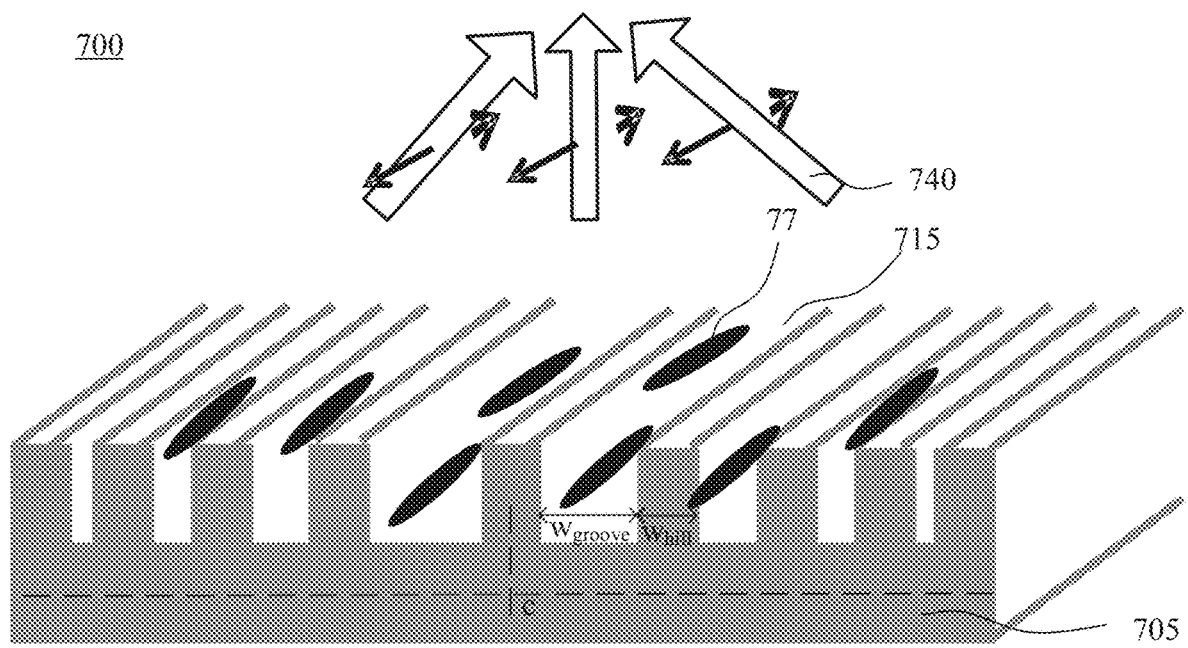
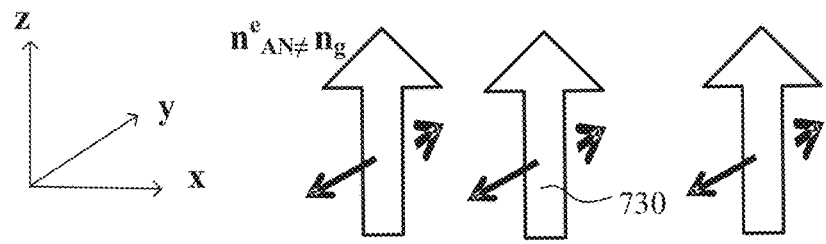
FIG. 7

1300

During a first moment, in-coupling, by a first in-coupling element, a first plurality of rays emitted from a light source assembly into a first waveguide via diffraction, and decoupling, by a first out-coupling element, the first plurality of rays out of the first waveguide into a first angular range of rays towards an eye-box via diffraction, where the first angular range of the rays corresponds to a first portion of the FOV provided by the light source assembly  ⎯ 1310

During a second moment, in-coupling, by a second in-coupling element, a second plurality of rays emitted from the light source assembly into a second waveguide via diffraction, and decoupling, by a second out-coupling element, the second plurality of rays out of the second waveguide into a second angular range of rays towards the eye-box via diffraction, where the second angular range of the rays corresponds to a second portion of the FOV  ⎯ 1320

During a first moment, in-coupling, by a first in-coupling element, an image light of a first color emitted from a first light source assembly into a first waveguide via diffraction, and decoupling, by a first out-coupling element, the image light of the first color out of the first waveguide towards an eye-box via diffraction — 1410

During a second moment, in-coupling, by a second in-coupling element, an image light of a second color emitted from a second light source assembly into a second waveguide via diffraction, and decoupling, by a second out-coupling element, the image light of the second color out of the second waveguide towards the eye-box via diffraction — 1420

FIG. 14

SWITCHABLE DIFFRACTIVE OPTICAL ELEMENT AND WAVEGUIDE CONTAINING THE SAME

BACKGROUND

Near-eye displays (NEDs) have been widely used in a variety of applications, such as video playback, gaming, and sports. NEDs have been used to realize virtual reality (VR), augmented reality (AR) or mixed reality (MR). AR or MR headsets display a virtual image overlapping with real-world images or see-through images. Pupil-expansion waveguide display systems with diffractive coupling structures are one of the most promising designs for AR/MR displays, potentially offering sun/eye-glasses form factors, a moderately large field of view (FOV), high transmittance and a large eye-box. A waveguide display system often includes a micro-display, collimator, and waveguide optics such as a waveguide combiner. The waveguide combiner integrates in-coupling and out-coupling elements that are often diffraction gratings, and a corresponding waveguide is referred to as a diffractive waveguide. Various diffraction gratings have been integrated into the waveguide, such as surface relief gratings obtained by nanofabrication or holographic gratings of various types.

BRIEF SUMMARY OF THE DISCLOSURE

One aspect of the present disclosure provides an optical device. The optical device includes a light source assembly configured to generate an image light; and at least one waveguide configured to guide the image light towards an eye-box of the optical device. The at least one waveguide includes an in-coupling element and an out-coupling element configured to transmit, via the at least one waveguide, a plurality of light fields of the image light to an eye-box of the optical device, in a time-multiplexing manner. At least one of the in-coupling element or the out-coupling element includes at least one switchable diffractive optical element, which includes a surface relief grating (SRG) filled with an optically anisotropic material. The optically anisotropic material has a first principal refractive index along a groove direction of the SRG and a second principal refractive index along an in-plane direction perpendicular to the groove direction. One of the first and second refractive principal refractive indices substantially matches a refractive index of the SRG, and the other mismatches the refractive index of the SRG.

Another aspect of the present disclosure provides a method for an optical device. The method includes during a first time period, in-coupling, by a first in-coupling grating, a first plurality of image lights corresponding to a first light field of a plurality of light fields into a first waveguide via diffraction, and decoupling, by a first out-coupling grating, the first plurality of image lights out of the first waveguide towards an eye-box of the optical device via the diffraction. The method further includes during a second time period, in-coupling, by a second in-coupling grating, a second plurality of image lights corresponding to a second light field of the plurality of light fields into a second waveguide via diffraction, and decoupling, by a second out-coupling grating, the second plurality of image lights out of the second waveguide towards an eye-box of the optical device via the diffraction.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

FIG. 3A illustrates a schematic diagram of a grating in a non-diffraction state, according to an embodiment of the disclosure;

FIG. 3B illustrates a schematic diagram of a grating in a diffraction state, according to an embodiment of the disclosure;

FIG. 4A illustrates a schematic diagram of a grating in a diffraction state, according to another embodiment of the disclosure;

FIG. 4B illustrates a schematic diagram of a grating in a non-diffraction state, according to another embodiment of the disclosure;

FIG. 7 illustrates a schematic diagram of a switchable diffractive optical element, according to another embodiment of the disclosure;

FIG. 13 illustrates a flow chart of a method of an optical device for delivering different portions of FOV in a time-multiplexing manner, according to an embodiment of the disclosure;

FIG. 14 illustrates a flow chart of a method of an optical device for delivering single-color images of different colors in a time-multiplexing manner, according to another embodiment of the disclosure.

DETAILED DESCRIPTION

Figure 1A:
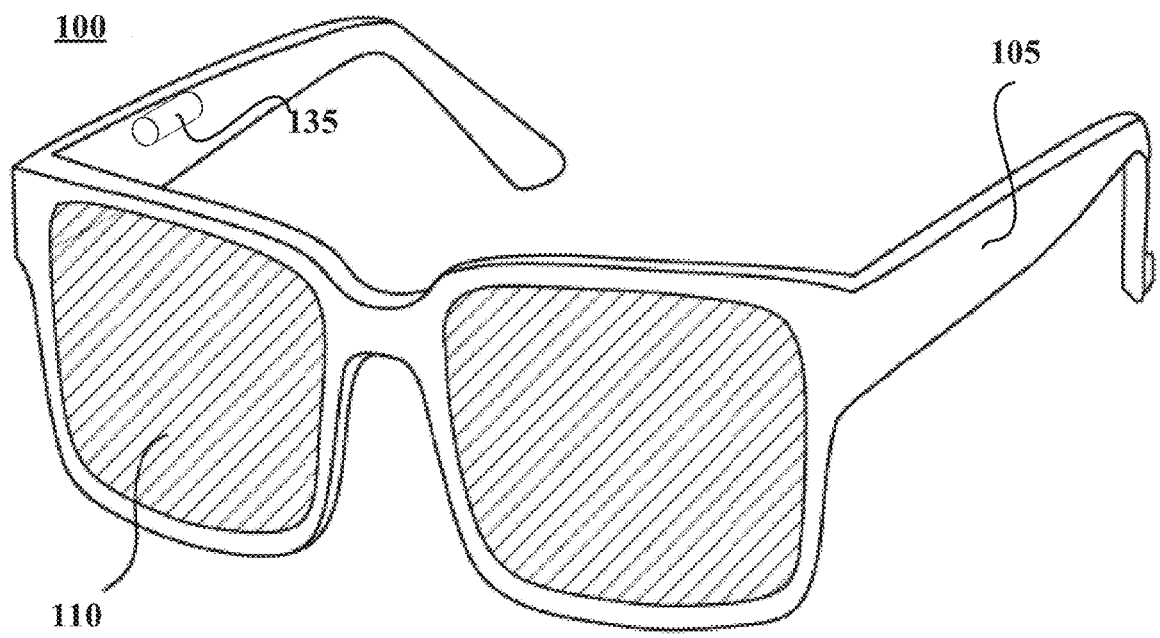
FIG. 1A illustrates a schematic diagram of a near-eye display (NED), according to an embodiment of the disclosure.

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted. Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an optical device. The optical device may include a light source assembly configured to generate an image light; and at least one waveguide configured to guide the image light to an eye-box of the optical device. The waveguide may include an in-coupling element and an out-coupling element, which are configured to transmit, via the waveguide, a plurality of light fields corresponding to the image light to the eye-box in a time-multiplexing manner. A light field may correspond to a predetermined portion of a field of view (FOV) of a single-color image, a predetermined portion of the FOV of a full-color image, or a single-color image of a predetermined color. At least one of the in-coupling element or the out-coupling element may include at least one switchable diffractive optical element. The switchable diffractive optical element may include a surface relief grating (SRG) filled with an active optically anisotropic material having a first principal refractive index along a groove direction of the SRG and a second principal refractive index along an in-plane direction perpendicular to the groove direction. One of the first and second principal refractive indices may substantially match a refractive index of the SRG, and the other may mismatch the refractive index of the SRG. The optically anisotropic material may include active or reorientable liquid crystals (LCs). The switchable diffractive optical element may be switchable between a diffraction state and a non-diffraction state due to reorientation of LCs in an external field, e.g., an electric field, a magnetic field, or a light, etc. The optical device may be a component of a near-eye display (NED).

The optically anisotropic material may be a uniaxial anisotropic material, whose refractive index ellipsoid has an axial symmetry with regard to its optic axis. $n^o_{AN}$ and $n^e_{AN}$ are principal refractive indices of the uniaxial anisotropic material. Nematic liquid crystals (LC) (except some exotic types like bend-core shaped) belong to the category of uniaxial anisotropic materials. Refractive index experienced by a light propagating in the nematic LC layer may be variable in a range between ordinary refractive index $n^o_{AN}$ and extraordinary refractive index $n^e_{AN}$, depending on the angle α between the light polarization and optical axis of the optically anisotropic material. For example, the refractive index experienced by a light propagating in the nematic LC layer may be varied from $n^o_{AN}$ to $n^e_{AN}$ when the angle α changes from 90° to 0°.

The switchable diffractive optical element may be polarization selective, for example, the diffractive optical element may selectively diffract a linearly polarized light having a first polarization, and transmit a linearly polarized light having a second polarization with negligible diffraction. The diffraction efficiency of the linearly polarized light having the first polarization may be controllable by the external field. The diffraction efficiency of the linearly polarized light having the first polarization may be lower than a predetermined threshold, for example, about 10%, 5%, 1%, 0.5%, 0.1% or 0.05%. In some embodiments, one of the first and second principal refractive indices may be the same as the refractive index of the SRG and, thus, the diffractive optical element may transmit the linearly polarized light having the second polarization without any diffraction.

FIG. 1A illustrates a schematic diagram of a near-eye display (NED) 100 according to an embodiment of the disclosure. In some embodiments, the NED 100 may be referred to as a head-mounted display (HMD). The NED 100 may present media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 acts as a VR device, an AR device and/or a MR device, or some combination thereof. In some embodiments, when the NED 100 acts as an AR and/or MR device, portions of the NED 100 and its internal components may be at least partially transparent.

As shown in FIG. 1A, the NED 100 may include a frame 105 and a display 110. Certain device(s) may be omitted, and other devices or components may also be included. The frame 110 may include any appropriate type of mounting structure to ensure the display 110 to be viewed as a NED by a user. The frame 105 may be coupled to one or more optical elements which together display media to users. In some embodiments, the frame 105 may represent a frame of eye-wear glasses. The display 110 is configured for users to see the content presented by the NED 100. As discussed below in conjunction with FIG. 1B, the display 110 may include at least one display assembly (not shown) for directing image light to an eye of the user. In some embodiments, the at least one display assembly may be a projection system. For illustrative purposes, FIG. 1A shows the projection system may include a projector 135 that is coupled to the frame 105.

Figure 1B:
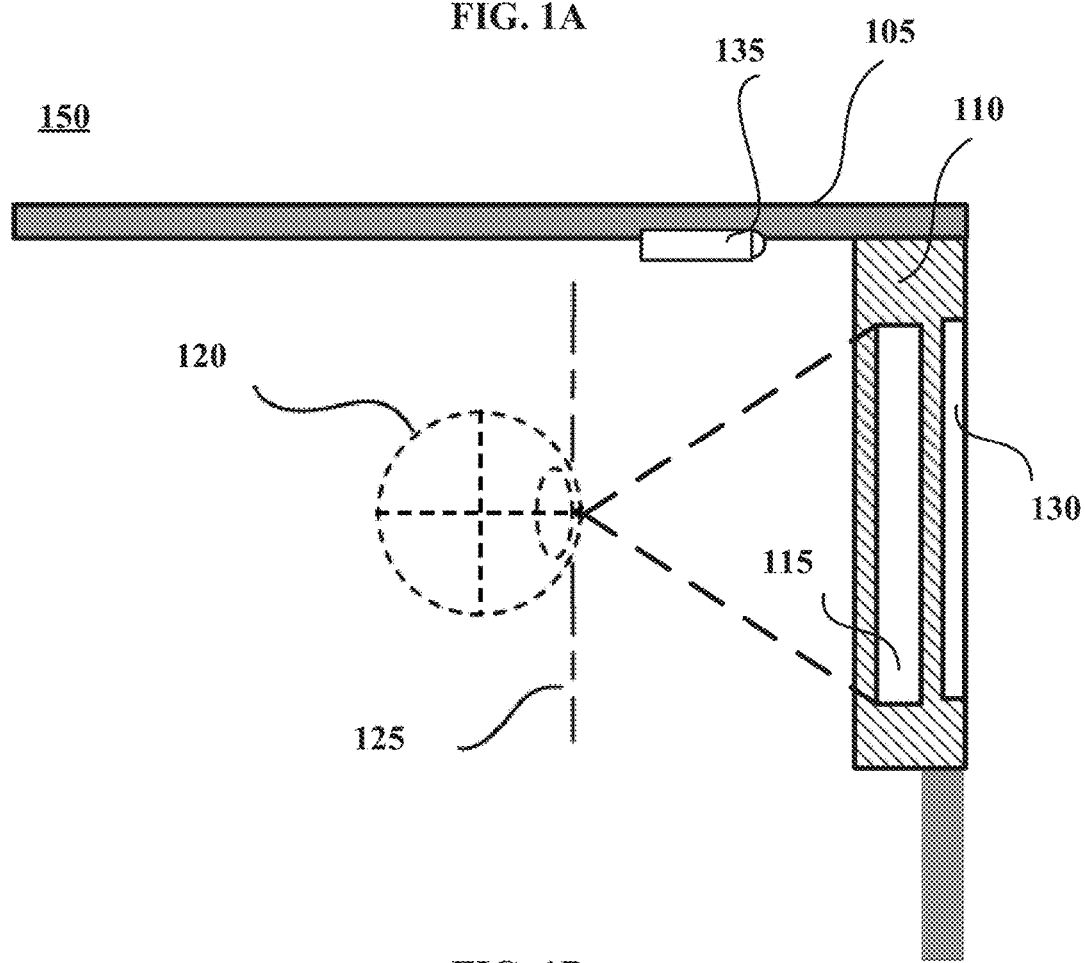
FIG. 1B illustrates a cross-section of the NED in FIG. 1A, according to an embodiment of the disclosure.

FIG. 1B is a cross-section 150 of the NED 100 shown in FIG. 1A according to an embodiment of the disclosure. The display 110 may include at least one waveguide display assembly 115. The waveguide display assembly 115 may include a waveguide or a stack of waveguides. An exit pupil 125 may be a location where an eye 120 is positioned in an eye-box region when the user wears the NED 100. For purposes of illustration, FIG. 1B shows the cross section 150 associated with a single eye 120 and a single waveguide display assembly 115, but in alternative embodiments not shown, another display assembly which is separate from the waveguide display assembly 115 shown in FIG. 1B, may provide image light to an eye-box located at an exit pupil of another eye of the user.

The waveguide display assembly 115, as illustrated below in FIG. 1B, may be configured to direct the image light to an eye-box located at the exit pupil 125 of the eye 120. The waveguide display assembly 115 may be composed of one or more materials (e.g., plastic, glass, etc.) with one or more refractive indices that effectively minimize the weight and widen the FOV of the NED 100. In some embodiments, the waveguide display assembly 115 may be a component (e.g., the display 110) of the NED 100. In some embodiments, the waveguide display assembly 115 may be part of some other NED, or other system that directs display image light to a particular location. As shown in FIG. 1B, the waveguide display assembly 115 may be for one eye 120 of the user. The waveguide display assembly 115 for one eye may be separated or partially separated from the waveguide display assembly 115 for the other eye. In certain embodiments, a single waveguide display assembly 115 may be used for both eyes 120 of the user.

In some embodiments, the NED 100 may include one or more optical elements between the waveguide display assembly 115 and the eye 120. The optical elements may act to, e.g., correct aberrations in image light emitted from the waveguide display assembly 115, magnify image light emitted from the waveguide display assembly 115, some other optical adjustment of image light emitted from the waveguide display assembly 115, or some combination thereof. The example for optical elements may include an aperture, a Fresnel lens, a convex lens, a concave lens, a filter, or any other suitable optical element that affects image light. In some embodiments, the NED 100 may include an adaptive dimming element 130, which may dynamically adjust the transmittance of the real-world objects viewed through the NED 100, thereby switching the NED 100 between a VR device and an AR device or between a VR device and a MR device. In some embodiments, along with switching between the AR/MR device and the VR device, the adaptive dimming element 130 may be used in the AR and/MR device to mitigate difference in brightness of real and virtual objects.

Figure 2A:
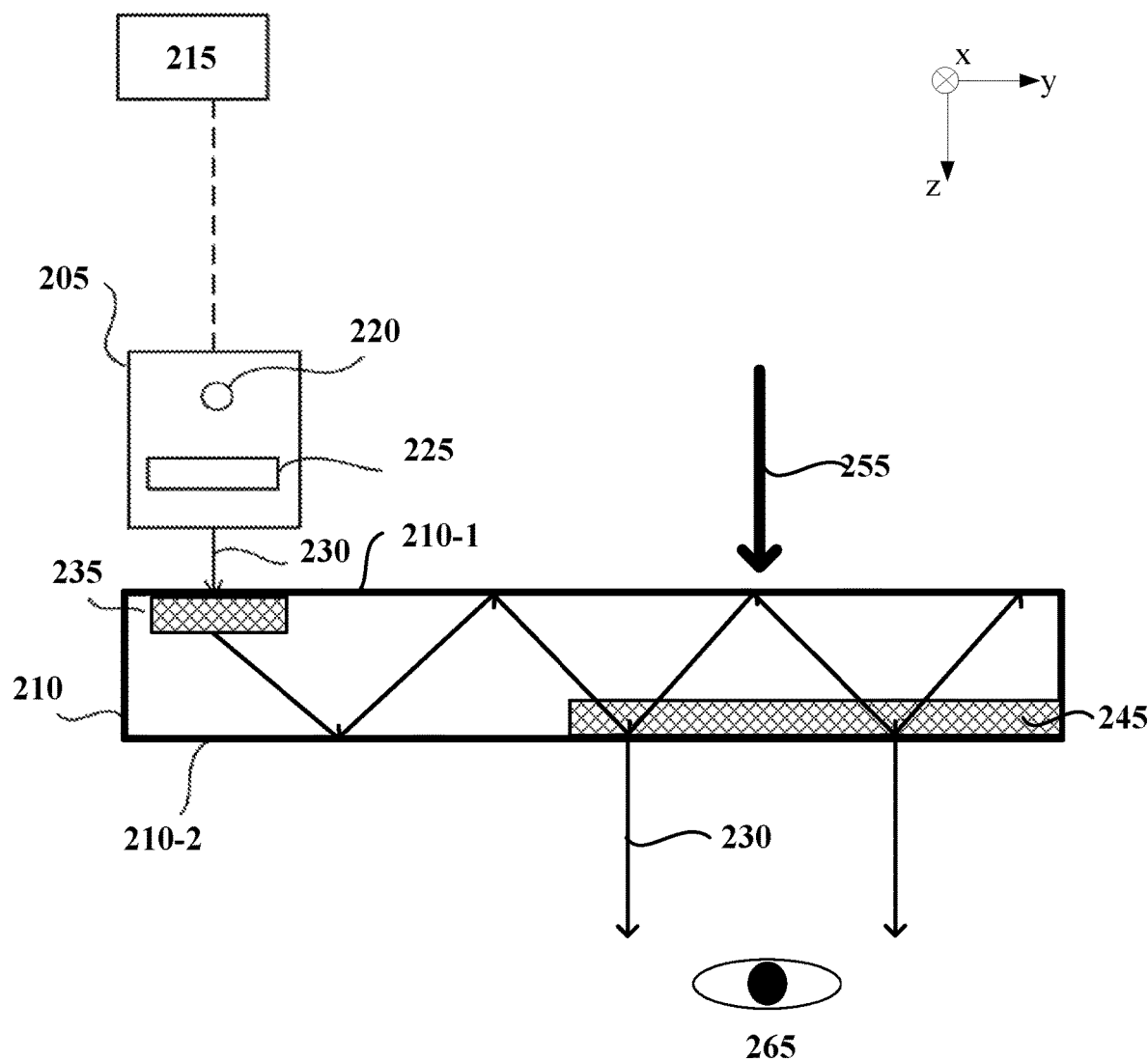
FIG. 2A illustrates a schematic diagram of a waveguide display assembly, according to an embodiment of the disclosure.

FIG. 2A illustrates a schematic diagram of a waveguide display assembly 200 according to an embodiment of the disclosure. The waveguide display assembly 200 may be implemented into NEDs for VR, AR or MR applications. As shown in FIG. 2A, the waveguide display assembly 200 may include a light source assembly 205, a waveguide 210, and a controller 215. The light source assembly 205 may include a light source 220 and an optics system 225. In some embodiments, the light source 220 may be a light source that generates coherent or partially coherent light. The light source 220 may include, e.g., a laser diode, a vertical cavity surface emitting laser, and/or a light emitting diode. In some embodiments, the light source 220 may be a display panel, such as a liquid crystal display (LCD) panel, a liquid-crystal-on-silicon (LCoS) display panel, an organic light-emitting diode (OLED) display panel, a micro light-emitting diode (micro-LED) display panel, a digital light processing (DLP) display panel, or some combination thereof. In some embodiments, the light source 220 may be a self-emissive panel, such as an OLED display panel or a micro-LED display panel. In some embodiments, the light source 220 may be a display panel that is illuminated by an external source, such as an LCD panel, an LCoS display panel, or a DLP display panel. Examples of an external sources may include a laser, an LED, an OLED, or some combination thereof. The optics system 225 may include one or more optical components that condition the light from the light source 220. Conditioning light from the light source 220 may include, e.g., transmitting, attenuating, expanding, collimating, and/or adjusting orientation in accordance with instructions from the controller 215.

The light source assembly 205 may generate an image light 230 and output the image light 230 to an in-coupling element 235 located at the waveguide 210. The waveguide 210 may expanded image light 230 to an eye 265 of the user. The waveguide 210 may receive the image light 230 at one or more in-coupling elements 235 located at the waveguide 210, and guide the received image light 230 to an out-coupling element 245 located at the waveguide 210, such that the received input image light 230 is decoupled out of the waveguide 210 towards the eye 265 via the out-coupling element 245. In some embodiments, the in-coupling element 235 may couple the image light 230 from the light source assembly 205 into the waveguide 210. The waveguide 210 may include a first surface 210-1 facing the real-world and an opposing second surface 210-2 facing the eye 265. In some embodiments, as shown in FIG. 2A, the in-coupling element 235 may be part of, or affixed to, the first surface 210-1 of the waveguide 210. In some embodiments, the in-coupling element 235 may be part of, or affixed to, the second surface 210-2 of the waveguide 210. In some embodiments, the in-coupling element 235 may include a surface relief grating, a volume hologram, a polarization grating, a polarization volume hologram, a metasurface grating, or other types of diffractive elements, or some combination thereof. In some embodiments, the in-coupling element 235 may include a diffraction grating, and a pitch of the diffraction grating may be chosen, such that the total internal reflection (TIR) occurs in the waveguide 210, and the image light 230 may propagate internally in the waveguide 210 (e.g., by total internal reflection). The in-coupling element 235 is also referred to as an in-coupling grating.

The out-coupling element 245 may be part of, or affixed to, the first surface 210-1 or the second surface 210-2 of the waveguide 210. In some embodiments, as shown in FIG. 2A, the out-coupling element 245 may be part of, or affixed to, the second surface 210-2 of the waveguide 210. In some embodiments, the out-coupling element 245 may be part of, or affixed to, the first surface 210-1 of the waveguide 210. In some embodiments, the out-coupling element 245 may include a surface relief grating, a volume hologram, a polarization grating, a polarization volume hologram, a metasurface grating, or other types of diffractive elements, or some combination thereof. In some embodiments, the out-coupling element 245 may include a diffraction grating, and the pitch of the diffraction grating may be configured to cause the incident image light 230 to exit the waveguide 210, i.e., redirecting image light 230 so that the TIR no longer occurs. Such a grating is also referred to as an out-coupling grating.

The waveguide 210 may be composed of one or more materials that facilitate total internal reflection of the image light 230. The waveguide 210 may be composed of, for example, plastic, glass, and/or polymers. The waveguide 210 may have a relatively small form factor. For example, the waveguide 210 may be approximately 50 mm wide along the x-dimension, 30 mm long along the y-dimension and 0.5-1 mm thick along the z-dimension. The controller 215 may control the operation scheme of the light source assembly 205. In some embodiments, the waveguide 210 may output the expanded image light 230 to the eye 265 with a large field of view (FOV). For example, the expanded image light 230 may be provided to the eye 265 with a diagonal FOV (in x and y) of 60 degrees and or greater and/or 150 degrees and/or less. The waveguide 210 may be configured to provide an eye-box with a width of 8 mm or greater and/or equal to or less than 50 mm, and/or a height of 6 mm or greater and/or equal to or less than 20 mm. Using the waveguide display assembly 200, the physical display and electronics may be moved to the side of the front rigid body and a fully unobstructed view of the real world may be achieved, therefore opening up the possibilities to true AR.

Figure 2B:
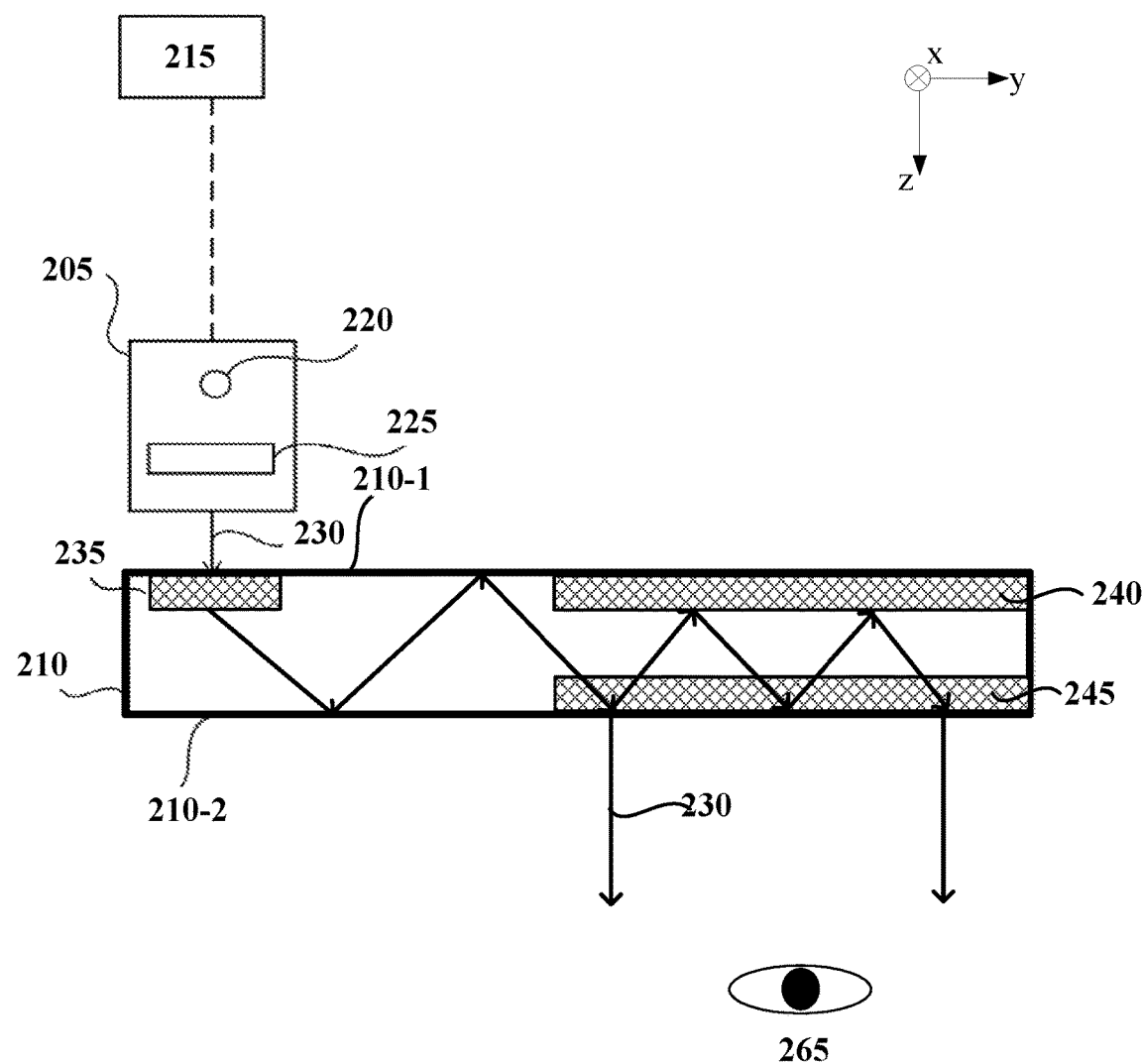
FIG. 2B illustrates a schematic diagram of a waveguide display assembly, according to another embodiment of the disclosure.

In some embodiments, the waveguide 210 may include additional gratings which redirect/fold and/or expand the pupil of the light source assembly 205. For example, as shown in FIG. 2B, in a waveguide display assembly 250, the waveguide 210 may further include a directing element 240 that redirects the received input image light 230 to the out-coupling element 245, such that the received input image light 230 is decoupled out of the waveguide 210 via the out-coupling element 245. The directing element 240 may be part of, or affixed to, the first side 210-1 of the waveguide 210, and the out-coupling element 245 may be part of, or affixed to, the second side 210-2 of the waveguide 210, such that the directing element 240 is arranged opposed to the out-coupling element 245. In some embodiments, the directing element 240 and the out-coupling element 245 may be structurally similar. In some embodiments, the directing element 240 may include a surface relief grating, a volume hologram, a polarization grating, a polarization volume hologram, a metasurface grating, or other types of diffractive elements, or some combination thereof. In some embodiments, the directing element 240 may include a diffraction grating, and in this case the directing element 240 is also referred to as a folding grating. In some embodiments, multiple functions, e.g., redirecting/folding and/or expanding the pupil of the light source assembly 205 may be combined into a single grating, e.g. an out-coupling grating.

Referring to FIGS. 2A-2B, in some embodiments, the waveguide display assembly 200/250 may include a plurality of waveguides stacked together, where each waveguide 210 is designed to handle, e.g., some portion of the FOV and/or some portion of the color spectrum of the virtual image. In some embodiments, the waveguide display assembly 200/250 may include a plurality of source assemblies 205 and/or a plurality of waveguides 210. Each of the source assemblies 205 may emit a monochromatic image light of a specific wavelength band corresponding to a primary color (e.g., red, green, or blue). The plurality of waveguides 210 may be stacked together to output an expanded image light 230 that is multi-colored, i.e., image light 230 of full colors. In some embodiments, each of the source assemblies 205 may emit full-color image lights corresponding to different portions of the FOV provided by the waveguide display assembly 200/250. In some embodiments, the source assembly 205 may include a plurality of light sources 220. Each of the light sources 220 may emit image lights of full colors. The full-color image lights emitted by different light sources 220 may correspond to different portions of the FOV provided by the waveguide display assembly 200/250. For example, the source assembly 205 may include three light sources 220 emitting full-color image lights corresponding to a left portion, a center portion and a right portion of the FOV, respectively.

Referring to FIGS. 2A-2B, in the waveguide display assembly 200/250, at least one of the in-coupling grating 235, the out-coupling grating 245 or the directing grating 235 may include at least one switchable diffractive optical element in accordance with an embodiment of the present disclosure. In some embodiments, the switchable diffractive optical element may be switchable between a diffraction state (or an On-state) and a non-diffraction state (or an Off-state) by an external field.

FIG. 3A-3B illustrate schematic diagrams of a grating 300 in a non-diffraction state and a diffraction state, respectively, according to an embodiment of the disclosure. As shown in FIGS. 3A-3B, the grating 300 may include a surface relief grating (SRG) 305 filled with an optically anisotropic material 315 consisting of elongated molecules. The SRG 305 may be a binary non-slanted grating. Molecules 310 of the optically anisotropic material 315 may be homogeneously aligned within the groove in the groove direction, for example, in the y-direction in FIGS. 3A-3B. The optically anisotropic material 315 may be uniaxial and have a first principal refractive index (e.g., $n^e_{AN}$) in the groove direction (e.g., y-direction) of the SRG 305 and a second principal refractive index (e.g., $n^o_{AN}$) along an in-plane direction (e.g., x-direction) perpendicular to the groove direction of the SRG 305. The second principal refractive index (e.g., $n^o_{AN}$) may substantially match a refractive index $n_g$ of the SRG 305, and the first principal refractive index (e.g., $n^e_{AN}$) may mismatch the refractive index $n_g$ of the SRG 305.

The SRG 305 may be fabricated from an organic material, such as amorphous or liquid crystalline polymers, crosslinkable monomers including those having LC properties (reactive mesogens (RM)), or fabricated from an inorganic material, such as metals or oxides used for manufacturing of metasurfaces. The materials of the SRG 305 may be isotropic or anisotropic. In some embodiments, the SRG 305 may be nanofabricated from a resist material that is transparent or nearly transparent to a range of EM frequencies, such as the visible band. The resist material may be a form of thermoplastic, polymer, optically transparent photoresist, and so on. After set or cured, the resist material may provide an alignment of the optically anisotropic material 315 filled into the SRG 305. That is, the SRG 305 may function as an alignment layer for the optically anisotropic material 315. Various alignment patterns and features (e.g., sub 10 nm) may be formed using the nanofabrication techniques of the SRG 305, which allows the creation of an alignment pattern of the optically anisotropic material 315 with high customizability. For example, the molecules of the optically anisotropic material 315 may be homeotropically or homogeneously or hybrid aligned within the grooves of the SRG 305. In some embodiments, the molecules 310 of the optically anisotropic material 315 may be homeotropically or homogeneously aligned within the grooves of the SRG 305 by a stretch, a light (e.g., photoalignment), an electric field, a magnetic field, or any appropriate aligning methods.

The optically anisotropic material 315 may include active materials that are switchable by an external field. The active materials may include active or reorientable liquid crystals (LCs), or polymerizable liquid crystal (LC) precursors, or some combinations thereof. In some embodiments, the polymerizable LC precursors may include reactive mesogens (RMs) that are polymerizable LC materials. In some embodiments, the grating 300 may further include two opposite substrates that form a container of the SRG 305 and the optically anisotropic material 315. In some embodiments, to enable an electrical switching of the grating 300, each substrate may be provided with a transparent electrode, such as an indium tin oxide (ITO) electrode. In some embodiments, the alignment of the optically anisotropic material 315 may be provided by one or more alignment layers other than the SRG 305, where the alignment layer may be disposed at the substrate. In some embodiments, the thickness of the optically anisotropic material 315 may be the same as a depth d of the SRG 305. In some embodiments, the thickness of the optically anisotropic material 315 may be different from the depth of the SRG 305, where the optically anisotropic material 315 disposed above the SRG 105 may be uniform and may not contribute to the diffraction.

The grating 300 may be sensitive to a linearly polarized incident light. As shown in FIG. 3A, for an incident light 320 polarized in the in-plane direction (e.g., x-direction) perpendicular to the groove direction of the SRG 305, due to the substantial refractive index match between $n°_{AN}$ and $n_g$, the grating 300 may appear to be a substantially optically uniform plate for the incident light 320 with negligible diffraction. That is, the grating 300 may be in a non-diffraction state for the incident light 320 polarized in the in-plane direction (e.g., x-direction) perpendicular to the groove direction of the SRG 305. In some embodiments, the second principal refractive index (e.g., $n°_{AN}$) may exactly match (or may be the same as) the refractive index $n_g$ of the SRG 305 and, thus, the incident light 320 may be transmitted through without any diffraction. That is, the diffraction effect of the grating 300 may be completely turned off.

As shown in FIG. 3B, for an incident light 330 polarized in the groove direction (e.g., y-direction) of the SRG 305, due to the refractive index difference between $n^e_{AN}$ and $n_g$, the light 330 may experience a periodic modulation of the refractive index in the grating 300 and become diffracted. That is, the grating 300 may be in a diffraction state for the incident light 330 polarized in the groove direction (e.g., y-direction) of the SRG 305. The diffraction efficiency of the light 330 may be determined by the modulation of refractive index nm (i.e., the difference between the $n^e_{AN}$ and $n_g$) provided by the grating 300. The diffraction efficiency may be controllable by an externa field, e.g. an electric field, a magnetic field, or a light, etc.

FIGS. 4A-4B illustrate a schematic diagram of a grating 400 in a diffraction state and a non-diffraction state, respectively. The similarities between FIGS. 4A-4B and FIGS. 3A-3B are not repeated, while certain differences may be explained. As shown in FIGS. 4A-4B, molecules 410 of an optically anisotropic material 415 may be homogeneously aligned within the groove in the groove direction, for example, in the y-direction in FIGS. 4A-4B. The optically anisotropic material 415 may have a first principal refractive index (e.g., n$^e$AN) in a groove direction (e.g., y-direction) of the SRG 405 and a second principal refractive index (e.g., n°AN) along an in-plane direction (e.g., x-direction) perpendicular to the groove direction of the SRG 405. The second principal refractive index (e.g., n°AN) may mismatch a refractive index $n_g$ of the SRG 405, and the first principal refractive index (e.g., $n^e_{AN}$) may substantially match the refractive index $n_g$ of the SRG 405.

The grating 400 may be sensitive to a linearly polarized incident light. As shown in FIG. 4A, for an incident light 420 polarized in the in-plane direction (e.g., x-direction) perpendicular to the groove direction of an SRG 405, due to the refractive index difference between $n°_{AN}$ and $n_g$, the light 420 may experience a periodic modulation of the refractive index in the grating 400 and, thus, get diffracted. That is, the grating 400 may be in a diffraction state for the incident light 430 polarized in the in-plane direction (e.g., x-direction) perpendicular to the groove direction of the SRG 405. The diffraction efficiency of the light 420 may be determined by the modulation of refractive index nm (i.e., the difference between the $n°_{AN}$ and $n_g$) provided by the grating 400.

As shown in FIG. 4B, for an incident light 430 polarized in the groove direction (e.g., y-direction) of the SRG 405, due to the substantial refractive index match between $n^e_{AN}$ and $n_g$, the grating 400 may appear to be a substantially optically uniform plate for the incident light 420 with negligible diffraction. That is, the grating 400 may be in a non-diffraction state for the incident light 430 polarized in the groove direction (e.g., y-direction) of the SRG 405. In some embodiments, the first principal refractive index (e.g., n$^e$AN) may exactly match (or may be the same as) the refractive index $n_g$ of the SRG 405 and, thus, the incident light 430 may be transmitted through without any diffraction. That is, the diffraction effect of the grating 400 may be completely turned off.

Figure 5B:
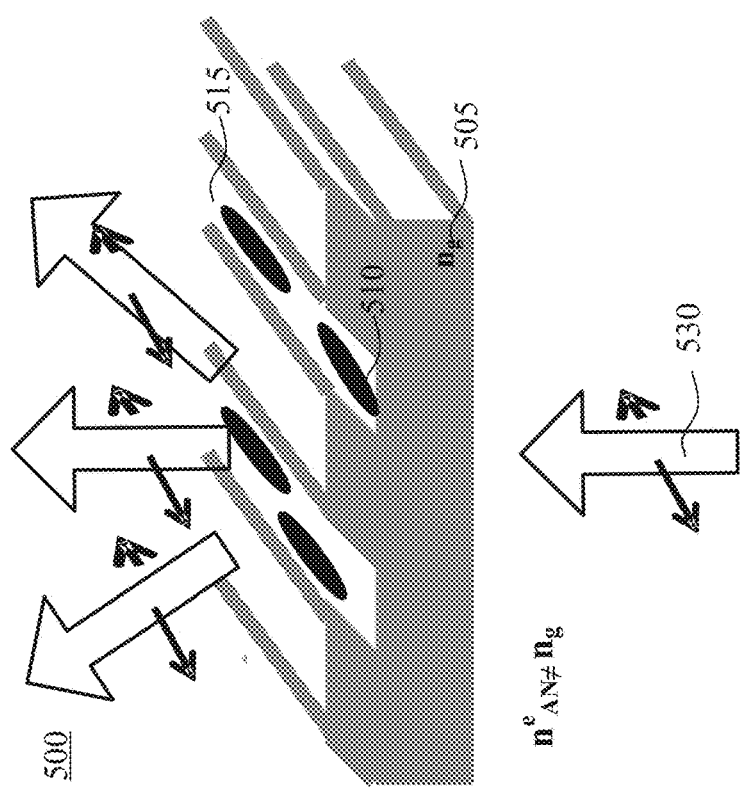
FIG. 5B illustrates a schematic diagram of a grating in a diffraction state, according to another embodiment of the disclosure.
Figure 5A:
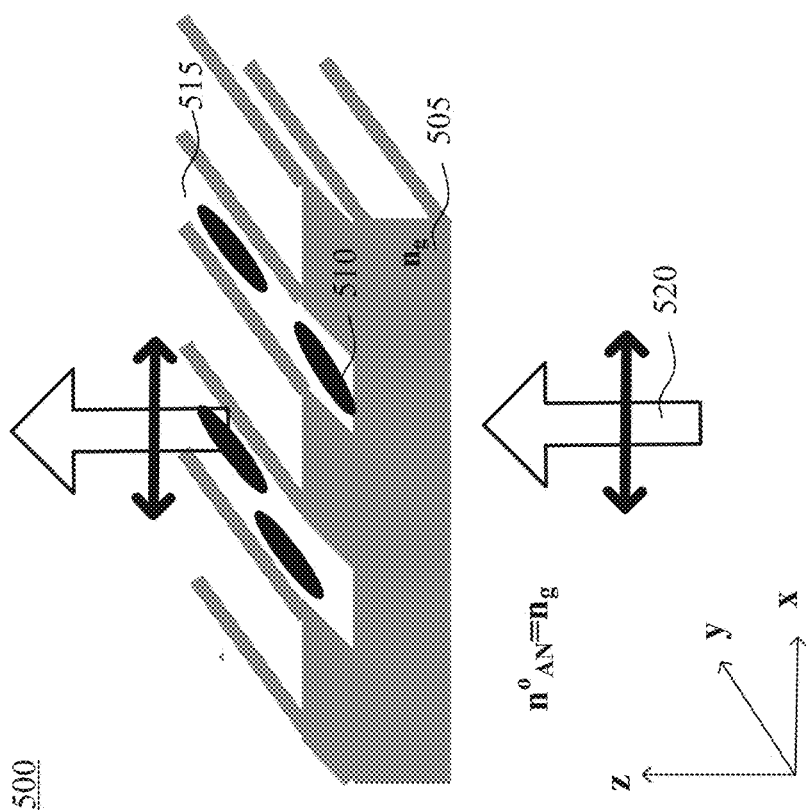
FIG. 5A illustrates a schematic diagram of a grating in a non-diffraction state, according to another embodiment of the disclosure.

FIGS. 5A-5B illustrate a schematic diagram of a grating 500 in a non-diffraction state and a diffraction state, respectively. The similarities between FIGS. 3A-3B and FIGS. 5A-5B are not repeated, while certain differences may be explained. Similar to the grating 300 in FIGS. 3A-3B, the grating 500 shown in FIGS. 5A-5B may include an SRG 505 filled with an optically anisotropic material 515. Different from the binary non-slanted SRG 305 in FIGS. 3A-3B, the SRG 505 in FIGS. 5A-5B may be a binary slanted grating. The diffraction state and the non-diffraction state of the grating 500 in FIGS. 5A-5B may be referred to that of the grating 300 in FIGS. 3A-3B, and the details are not repeated here.

Figure 6A:
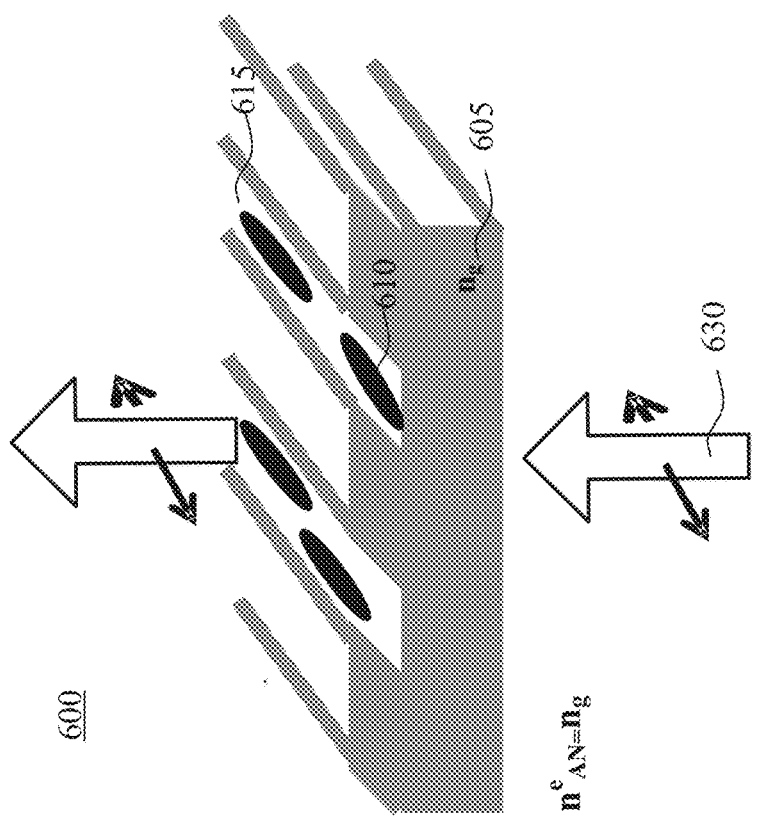
FIG. 6A illustrates a schematic diagram of a grating in a diffraction state, according to another embodiment of the disclosure.
Figure 6B:
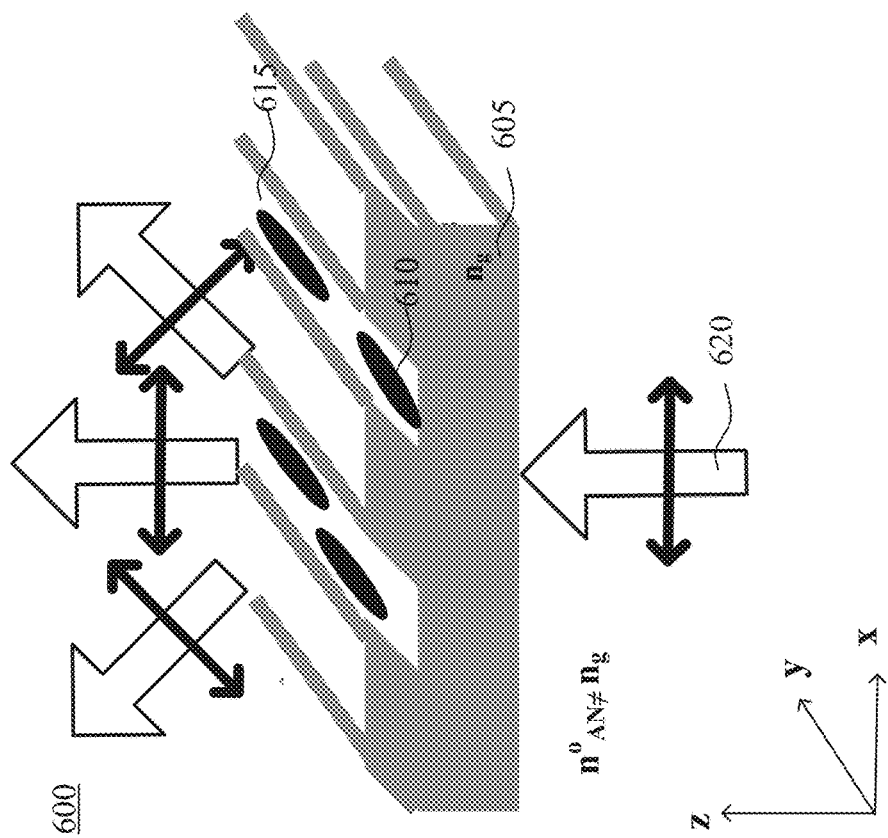
FIG. 6B illustrates a schematic diagram of a grating in a non-diffraction state, according to another embodiment of the disclosure.

FIGS. 6A-6B illustrate a schematic diagram of a grating 600 in a non-diffraction state and a diffraction state, respectively. The similarities between FIGS. 4A-4B and FIGS. 6A-6B are not repeated, while certain differences may be explained. Similar to the grating 400 in FIGS. 4A-4B, the grating 600 shown in FIGS. 6A-6B may include an SRG 605 filled with an optically anisotropic material 615. Different from the binary non-slanted SRG 405 in FIGS. 4A-4B, the SRG 605 in FIGS. 6A-6B may be a binary slanted grating. The diffraction state and the non-diffraction state of the grating 600 in FIGS. 6A-6B may be referred to that of the grating 400 in FIGS. 4A-4B, and the details are not repeated here.

FIGS. 3A-6B show the diffractive optical element is an active grating that includes an SRG having a periodic rectangular profile, i.e., the cross-sectional profile of the grooves of the SRG has a periodic rectangular shape, which is for illustrative purposes and not intended to limit the scope of the present disclosure. In some embodiments, the fringes of the grating may be linear, i.e. the grating may be a one-dimensional grating. In some embodiments, the diffractive optical element may include a plurality of SRGs that are patterned and/or stacked. In some embodiments, the cross-sectional profile of the grooves of the SRG may be non-rectangular, for example, sinusoidal, triangular or saw-tooth, depending on the application scenarios. In some embodiments, the cross-sectional profile of the grooves of the SRG may be non-periodic, an exemplary diffractive optical element will be described in FIG. 7. In some embodiments, the diffractive optical element may be configured with or without optical power. The disclosed diffractive optical elements may also realize almost the same optical functions as conventional refractive optics, such as lenses, prisms or aspheres, but may be much smaller and lighter.

FIG. 7 illustrates a schematic diagram of a switchable diffractive optical element 700, according to another embodiment of the disclosure. As shown in FIG. 7, the diffractive optical element 700 may include an SRG 705 filled with an optically anisotropic material 715. Molecules 710 of the optically anisotropic material 715 may be homogeneously or homeotropically aligned within the groove, for example, homogeneously aligned in a groove direction (e.g., y-direction) of the SRG 705. The optically anisotropic material 715 may have a first principal refractive index (e.g., an extraordinary refractive index $n^e_{AN}$) in the groove direction (e.g., y-direction) of the SRG 705 and a second principal refractive index (e.g., an ordinary refractive index $n^o_{AN}$) along an in-plane direction (e.g., x-direction) perpendicular to the groove direction. One of the first principal refractive index and the second principal refractive index may substantially match a refractive index $n_g$ of the SRG 705, and the other may mismatch the refractive index $n_g$ of the SRG 705. For discussion purposes, in the diffractive optical element 700, the second principal refractive index (e.g., $n^o_{AN}$) of the optically anisotropic material 715 may substantially match the refractive index $n_g$ of the SRG 705, and the first principal refractive index (e.g., $n^e_{AN}$) in the groove direction (e.g., y-direction) of the SRG 705 may mismatch the refractive index $n_g$ of the SRG 705.

The cross-sectional profile of the grooves of the SRG 705 may have a non-periodic rectangular profile. In the in-plane direction (e.g., x-direction) perpendicular to the groove direction (e.g., y-direction) of the SRG 705, the periodicity (($w_{groove}+w_{hill}$) of the SRG 705 may monotonically decrease from a center (c) to a periphery of the SRG 705, through which a light focusing effect is achieved. For an incident light 730 polarized in the groove direction (e.g., y-direction) of the SRG 705, due to the refractive index difference between $n^e_{AN}$ and $n_g$, the light 730 may experience a periodic modulation of the refractive index in the diffractive optical element 700 and become diffracted. Through configuring the cross-sectional profile of the grooves of the SRG 705, as well as, the refractive indices of the optically anisotropic material 715 and the SRG 705, diffracted light beams 740 may be further focused. That is, the diffractive optical element 700 may function a cylindrical diffractive lens. The diffractive optical element 700 may also include other elements, such as substrates, electrodes for electrically switching, alignment layers, etc., and FIG. 7 merely shows a partial structure of the diffractive optical element 700.

A switching between a diffraction state and a non-diffraction state of an active diffractive optical element (e.g., an active grating) in accordance with an embodiment of the present disclosure will be explained in the following with the accompanying FIGS. 8A-8C and FIGS. 9A-9B. In some embodiments, an active diffractive optical element in accordance with an embodiment of the present disclosure may be switchable between a non-diffraction state and a diffraction state by applying an electric field to the active LC materials, due to an electric-field-induced reorientation of the LCs filled into the SRG. In some embodiments, the active diffractive optical element may be switchable between a non-diffraction state and a diffraction state by applying a light to the active LC materials, due to a photo-induced reorientation of the LCs filled into the SRG. In some embodiments, the active diffractive optical element may be switchable between a non-diffraction state and a diffraction state by applying a magnetic field to the active LC materials, due to a magnetic-field-induced reorientation of the LCs filled into the SRG. Further, in the diffraction state, the diffraction efficiency of a light incident onto the active diffractive optical element may be continuously changeable via continuously varying the applied electric field or light or magnetic field. That is, the active diffractive optical element may be configured to provide different diffraction efficiency to an incident light, thereby satisfying different application scenarios. In some embodiments, at least one of the electrodes of the active diffractive optical element may include pixelated electrodes. A light incident onto the active diffractive optical element may irradiate one or more pixelated electrodes, and the diffraction efficiency of the light may spatially vary by applying different voltages to the different pixelated electrodes. For discussion purposes, a grating filled with active LCs is used as example to explain the switching of the disclosed diffractive optical elements in FIGS. 8A-8C and FIGS. 9A-9B.

Figure 8A:
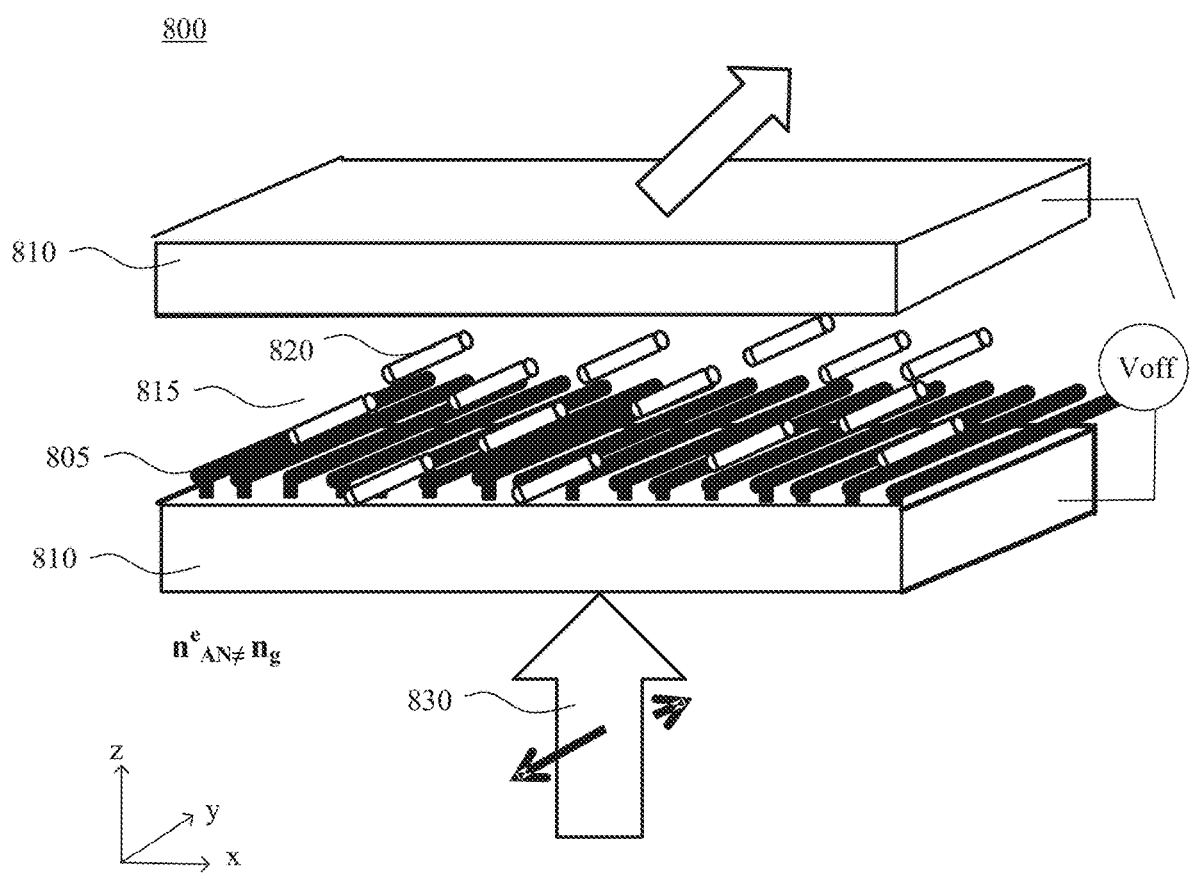
FIGS. 8A-8C illustrate a schematic diagram of switching an active grating, according to an embodiment of the disclosure.
Figure 8B:
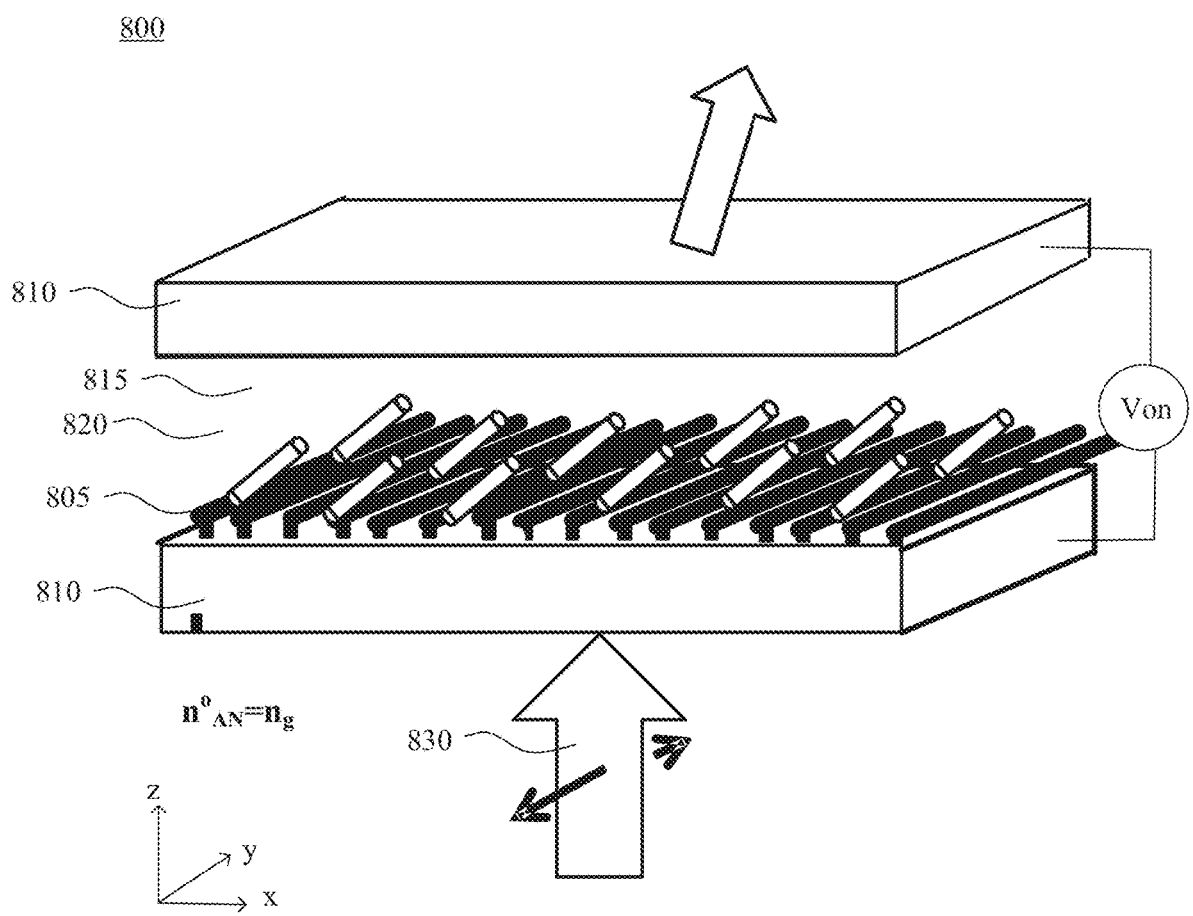
Figure 8C:
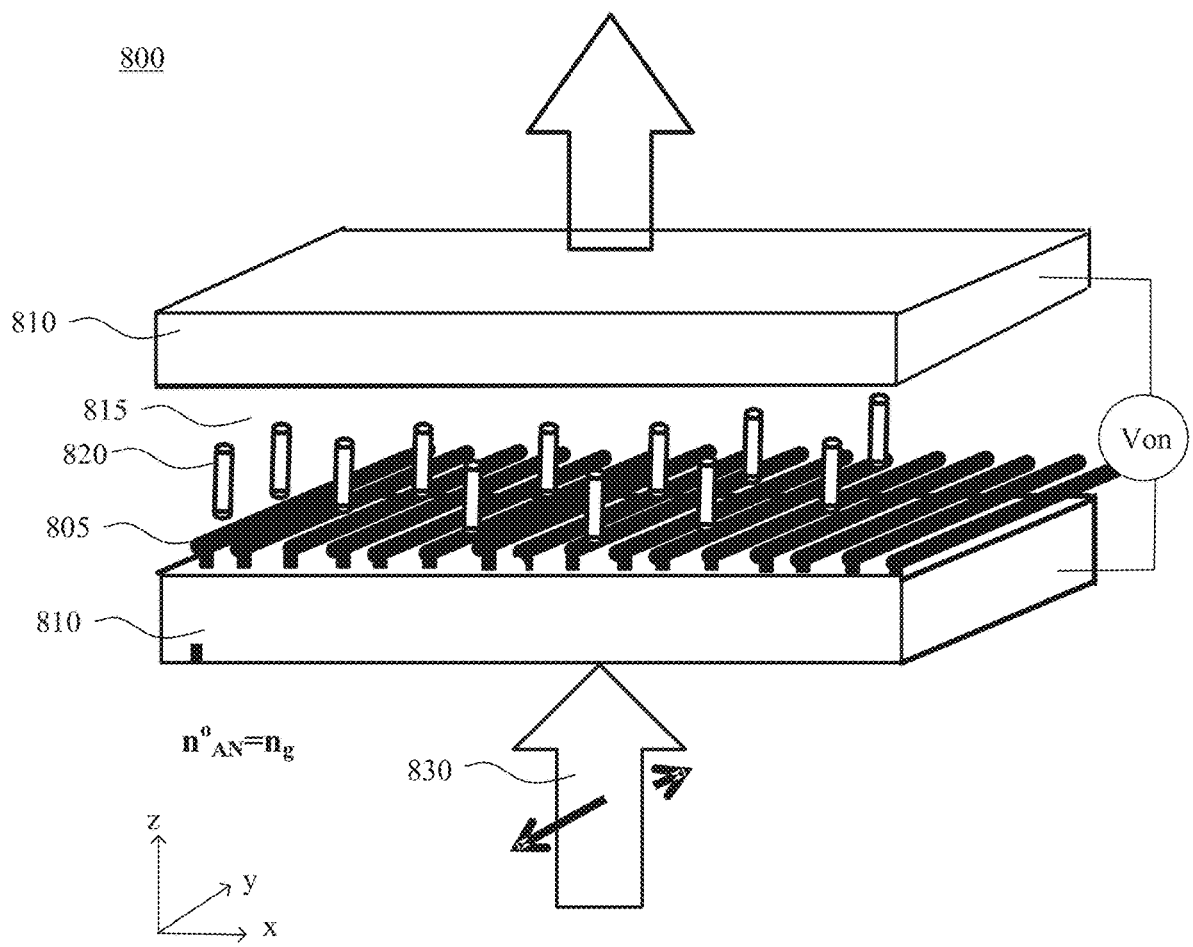

FIGS. 8A-8C illustrate a schematic diagram of switching a diffractive optical element 800, according to an embodiment of the disclosure. For discussion purposes, the diffractive optical element 800 may be a grating 800. As shown in FIGS. 8A-8C, the grating 800 may include upper and lower substrates 810 arranged opposite to each other. Each substrate 810 may be provided with a transparent electrode at an inner surface of the substrate 810 for applying an electric field to the grating 800, such as an ITO electrode (not drawn). The grating 800 may include an SRG 805 bonded to or formed on the lower substrate 810 and an optical anisotropic material 815 filled into grooves of the SRG 805. The optical anisotropic material 815 may include active anisotropic materials, such as active LCs having positive or negative dielectric anisotropy. The optically anisotropic material 815 may have a first principal refractive index (e.g., $n^e{AN}$) in the groove direction (e.g., y-direction) of the SRG 805 and a second principal refractive index (e.g., $n^o_{AN}$) along an in-plane direction (e.g., x-direction) perpendicular to the groove direction of the SRG 805.

For discussion purposes, in FIGS. 8A-8C, the optical anisotropic material 815 may include active LCs having positive anisotropy, such as nematic liquid crystals (NLCs). LC molecules 820 may be homogeneously aligned within the groove in the groove direction, for example, y-direction. The second principal refractive index (e.g., $n^o_{AN}$) may substantially match a refractive index $n_g$ of the SRG 805, and the first principal refractive index (e.g., $n^e_{AN}$) may mismatch the refractive index $n_g$ of the SRG 805. In a voltage-off state, as shown in FIG. 8A, for an incident light 830 polarized in the groove direction (e.g., y-direction) of the SRG 805, due to the refractive index difference between $n^e_{AN}$ and $n_g$, the light 830 may experience a periodic modulation of the refractive index when propagating through the grating 800 and, thus, get diffracted. That is, the grating 800 may be in a diffraction state (or On-state) for the incident light 830 polarized in the groove direction (e.g., y-direction) of the SRG 805.

In some embodiments, at the voltage-off state (or more generally, when applied voltage is lower than a threshold voltage to reorient the LC molecules 820), the modulation of refractive index nm (i.e., the difference between $n^e_{AN}$ and $n_g$) provided by the grating 800 to the light 830 may be the largest as compared to other voltage-on states. Accordingly, the diffraction efficiency of the light 830 may be the highest. In a voltage-on state, as shown in FIG. 8B, an electric field (e.g., along a z-direction) may be generated between the two opposite substrates 810. When the applied voltage is gradually increased to be higher than the threshold hold voltage, the LC molecules 820 having positive dielectric anisotropy may trend to be reoriented along the electric field. As the applied voltage changes, for the incident light 830 polarized in the groove direction (e.g., y-direction) of the SRG 805, the modulation of refractive index nm (i.e., the difference between $n^e_{AN}$ and $n_g$) provided by the grating 800 may change accordingly, which in turn changes the diffraction efficiency provided by the grating 800 to the incident light 830. Further, in the diffraction state, the diffraction efficiency provided by the grating 800 to the incident light 830 may be continuously adjustable via continuously varying the applied voltage. That is, the grating 800 may provide different diffraction efficiency to the light 830, thereby satisfying different application scenarios. In some embodiments, at least one of the electrodes of the grating 800 may include a plurality of pixelated electrodes. The light 830 may irradiate one or more pixelated electrodes, and the diffraction efficiency of the light 830 may spatially vary by applying different voltages to the different pixelated electrodes.

In the voltage-on state where the applied voltage is sufficiently high, as shown in FIG. 8C, the LC molecules 820 having the positive dielectric anisotropy may be reoriented to be parallel to the electric field direction (e.g., z-direction). For the incident light 830 polarized in the groove direction of the SRG 805, due to the substantial refractive index match between $n^o_{AN}$ and $n_g$, the grating 800 may appear to be a substantially optically uniform plate for the incident light 830. That is, the grating 800 may be in a non-diffraction state (or Off-state) for the incident light 830 polarized in the groove direction of the SRG 805. In some embodiments, the second principal refractive index (e.g., $n^o_{AN}$) may exactly match (or may be the same as) the refractive index $n_g$ of the SRG 805 and, thus, the light 830 may be transmitted through the grating 800 without any diffraction. That is, the diffraction effect of the grating 800 may be completely turned off for the incident light 830.

Figure 9A:
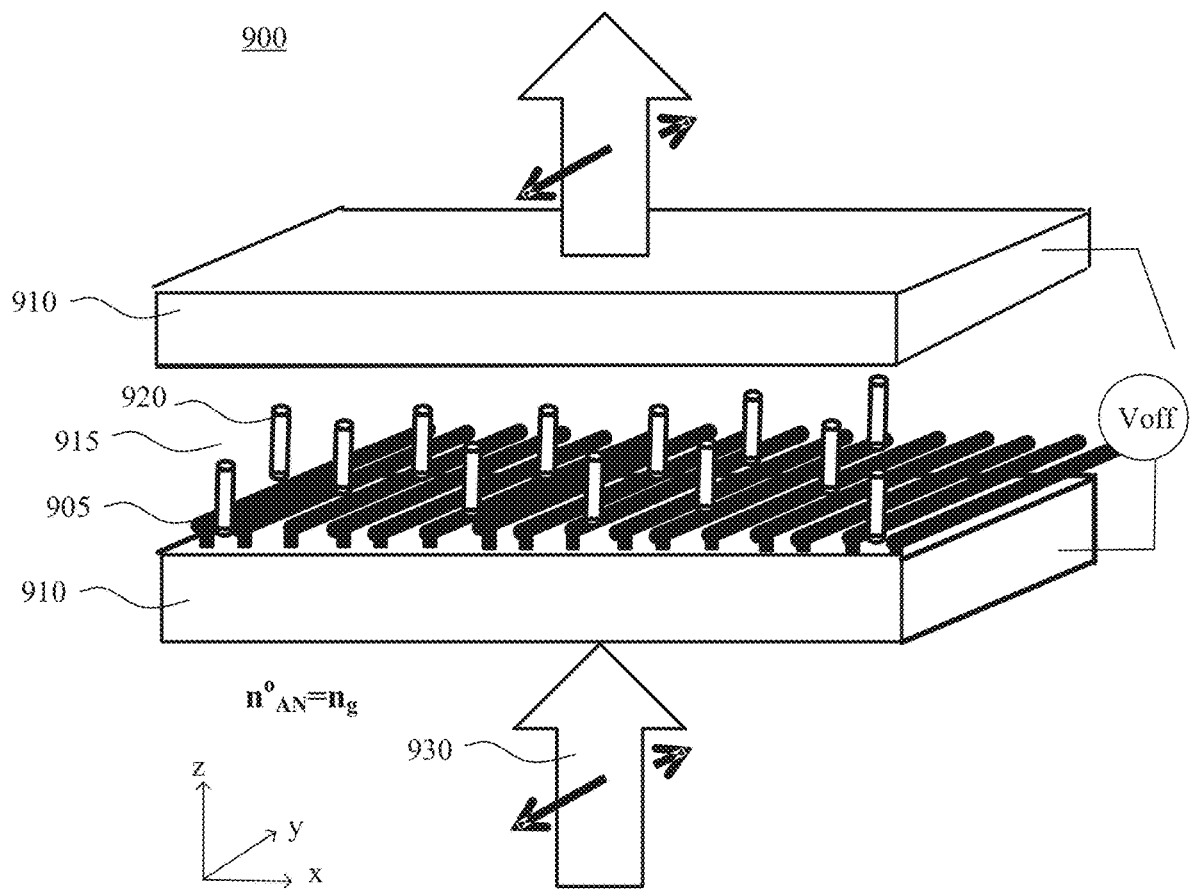
FIGS. 9A-9B illustrate a schematic diagram of switching an active grating, according to another embodiment of the disclosure.
Figure 9B:
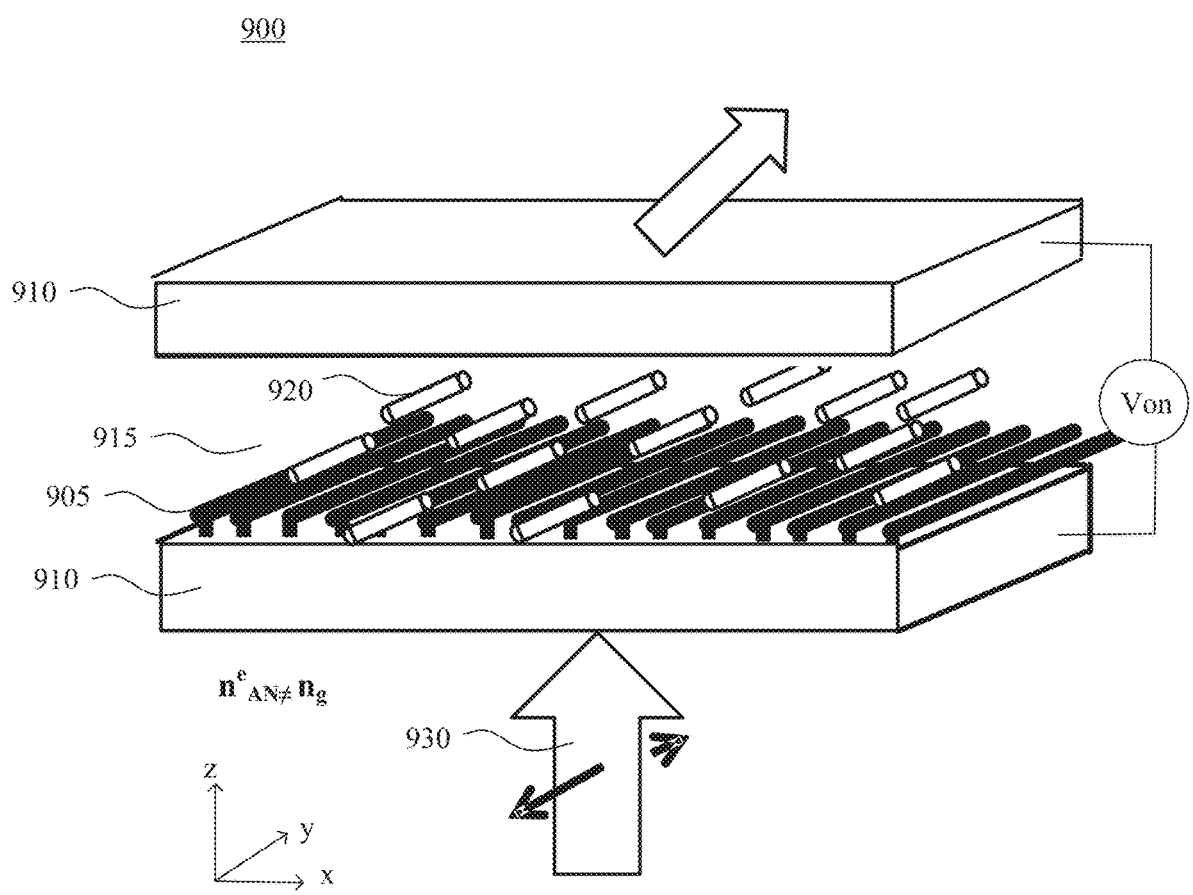

FIGS. 9A-9B illustrate a schematic diagram of switching a diffractive optical element 900, according to another embodiment of the disclosure. The similarities between FIGS. 9A-9B and FIGS. 8A-8C may be not repeated, while certain differences may be explained. Different from the active LCs 815 having the positive dielectric anisotropy filled into the SRG 805 shown in FIGS. 8A-8C, an SRG 905 in FIGS. 9A-9B may be filled with active LCs 915 having negative dielectric anisotropy. LC molecules 920 may be homeotropically aligned within the groove of the SRG 905 in an out-of-plane direction perpendicular to a substrate 910, for example, the z-direction in FIGS. 9A-9B. The second principal refractive index (e.g., $n^o_{AN}$) of the LCs 915 may substantially match a refractive index $n_g$ of the SRG 905, and the first principal refractive index (e.g., $n^e_{AN}$) of the LCs 915 may mismatch the refractive index $n_g$ of the SRG 905.

In a voltage-off state where the applied voltage is zero (or more generally, the applied voltage is lower than the threshold voltage to reorient the LC molecules 920), as shown in FIG. 9A, the LC molecules 920 having negative dielectric anisotropy may be homeotropically aligned within the groove, for example, in the z-direction. For an incident light 930 polarized in the groove direction (e.g., y-direction) of the SRG 905, due to the substantial refractive index match between $n^o_{AN}$ and $n_g$, the grating 900 may appear to be a substantially optically uniform plate for the light 930. That is, the grating 900 may be in a non-diffraction state for the light 930 polarized in the groove direction of the SRG 905. In some embodiments, the second principal refractive index (e.g., $n^o_{AN}$) of the LCs 915 may substantially match the refractive index $n_g$ of the SRG 905, and the light 930 may be transmitted through the grating 800 with negligible diffraction. In some embodiments, the second principal refractive index (e.g., $n^o_{AN}$) of the LCs 915 may be the same as the refractive index $n_g$ of the SRG 905 and, thus, the light 930 may be transmitted through without any diffraction. That is, the diffraction effect of the grating 900 may be completely turned off for the light 930 polarized in the groove direction of the SRG 905.

In a voltage-on state, as shown in FIG. 9B, an electric field may be generated between the electrodes at two opposite substrates 910, and the LC molecules 920 having negative dielectric anisotropy may be reoriented by the electric field from a vertical (homeotropic) state to a horizontal (planar) state. The long axes of the LC molecules 920 may tend to be perpendicular to the electric field direction (e.g., z-direction) and parallel to the groove direction (e.g., y-direction) of the SRG 905 when the applied voltage is sufficiently high. The light 930 polarized in the groove direction (e.g., y-direction) of the SRG 905 may experience a periodic modulation of the refractive index in the grating 900 and, thus, get diffracted due to the refractive index difference between $n^e_{AN}$ and $n_g$. That is, the grating 900 may be in a diffraction state for the light 930 polarized in the groove direction (e.g., y-direction) of the SRG 905. Referring to FIGS. 8A-8C and FIGS. 9A-9B, when the grating is at a voltage-off state, the grating may be in a diffraction state or a non-diffraction state, similarly, when the grating is at a voltage-on state, the grating may be in a diffraction state or a non-diffraction state, depending on the configuration of the grating and the polarization of the incident light.

Active gratings in accordance with an embodiment of the present disclosure may enable time-multiplexing of a plurality of different light fields (e.g., portions of FOV, images in various colors, etc.) delivered by one or more waveguides. FOV in waveguides is often limited by the angular bandwidth of gratings, as well as the angular limitation of waveguides that is mainly determined by refractive index of the waveguides. One method to expand FOV is splitting of the FOV in several portions and delivering the portions by different gratings or sets of gratings. To avoid crosstalk between the gratings, the light fields corresponding to different parts of FOV may be desired to be delivered in different time frames, e.g., by using time-multiplexing approach. In the following, exemplary waveguide architectures corresponding to a "symmetrical" case where the FOV is not rotated after translation through the waveguide are explained. This case may also correspond to compensation of optical dispersion caused by separate gratings in the waveguide, through which a broadband light source may be allowed to be used as a light source coupled to the waveguide. For example, mutual compensation of the dispersion caused by the in-coupling and outcoupling gratings may be achieved in the two-grating waveguides. Mathematical expression describing this regime is $\Sigma_i^n k_i = 0$, where k is a grating vector of the i-th grating, n is the number of gratings on the way of light in a waveguide. That is, a vector sum of the grating vectors of the gratings which direct each portion of light in a waveguide may be substantially equal to zero. Active gratings in accordance with an embodiment of the present disclosure may allow expanding FOV by time-multiplexing different portions of FOV that is split and delivered by different pairs of active gratings arranged in different ways, such as in a way of tiling gratings at a common waveguide, or a way of stacking gratings at a common waveguide or different waveguides. Similar principles may be used to deliver images in different colors.

Figure 10A:
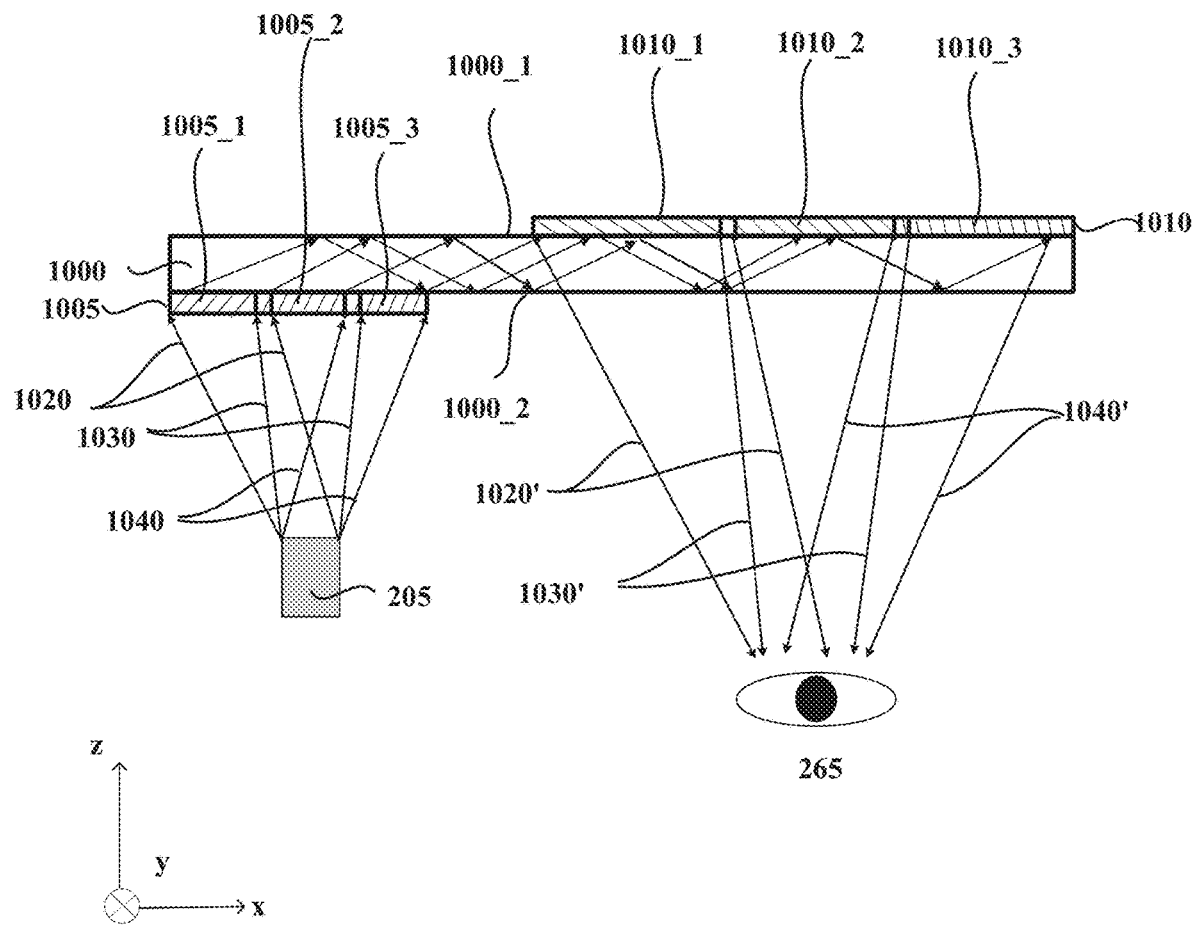
FIG. 10A illustrates a schematic diagram of a waveguide, according to an embodiment of the disclosure.
Figure 10B:
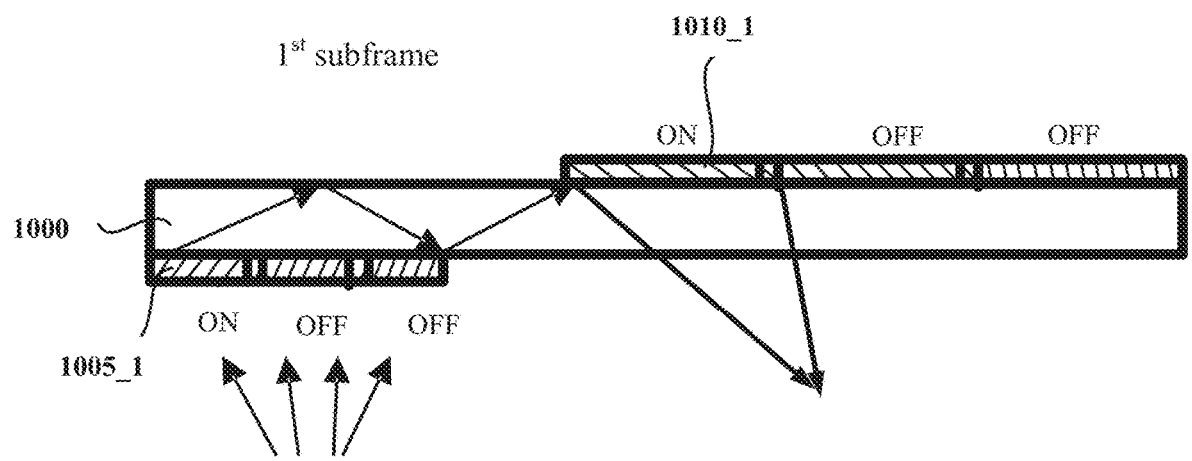
FIGS. 10B-10D illustrates an operation scheme of the waveguide in FIG. 10A to deliver different portions of field of view (FOV) in a time-multiplexing manner, according to an embodiment of the disclosure.
Figure 10C:
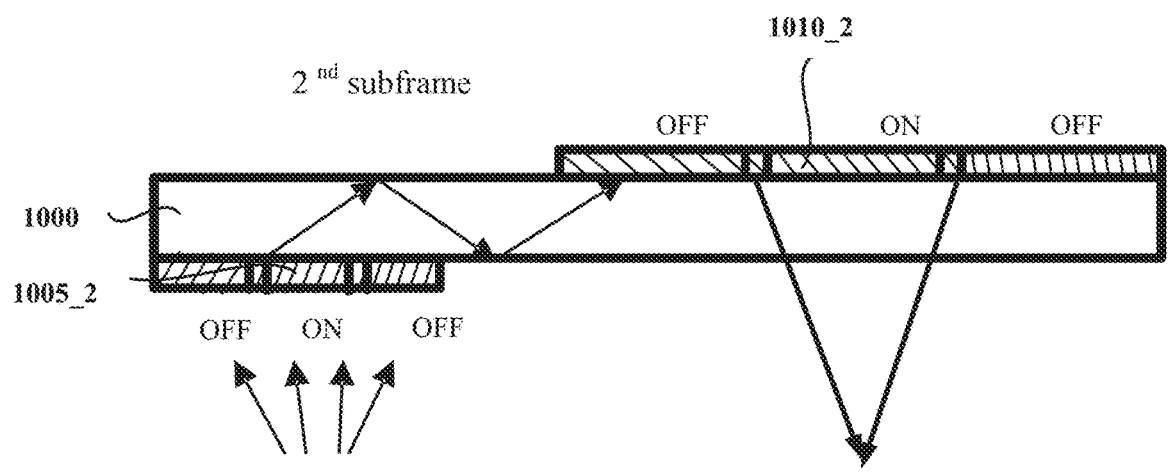
Figure 10D:
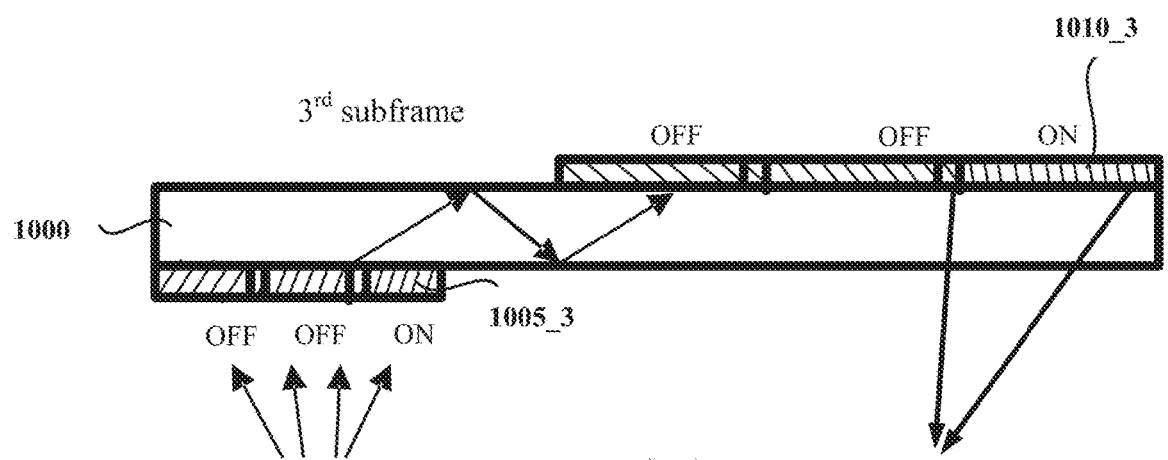

FIG. 10A illustrates a schematic diagram of a waveguide 1000, and FIGS. 10B-10D illustrate an operation scheme of the waveguide 1000 in FIG. 10A to deliver different portions of FOV in a time-multiplexing manner. The waveguide 1000 may be an embodiment of the waveguide 210 in FIGS. 2A-2B. As shown in FIG. 10A, the waveguide 1000 may be configured to receive an image light from the light source assembly 205 via an in-coupling grating 1005 and guide the image light towards the eye 265 via an out-coupling grating 1010. At least one of the in-coupling grating 1005 and the out-coupling grating 1010 may be any one of the disclosed active gratings. The in-coupling grating 1005 and the out-coupling grating 1010 each may include a plurality of subgratings where neighboring subgratings may be partially overlapped to get a continuous FOV. Exemplary overlapping configurations of the subgratings will be explained in the following with the accompanying FIGS. 10E-10F.

Referring to FIG. 10A, the subgratings of the in-coupling grating 1005 may be one-to-one corresponding to the subgratings of the out-coupling grating 1010. The number of subgratings of the respective gratings may be corresponding to the number of portions of FOV that is split. The subgratings in the in-coupling grating 1005 and the out-coupling grating 1010 may be disposed at a first surface 1000-1 and/or a second surface 1000-2 of the waveguide 1000. The subgratings of the in-coupling grating 1005 may be disposed at the same surface or different surfaces of the waveguide 1000. The subgratings of the out-coupling grating 1010 may be disposed at the same surface or different surfaces of the waveguide 1000. In some embodiments, the subgrating may have a 1D grating patterning to tile the FOV in one-dimension. In some embodiments, the subgrating may have a 2D grating patterning to tile the FOV in two-dimension.

For discussion purposes, the in-coupling grating 1005 and the out-coupling grating 1010 may be disposed at a second surface 1000_2 and a first surface 1000_1 of the waveguide 1000, respectively, and both the in-coupling grating 1005 and the out-coupling grating 1010 may be the disclosed switchable gratings. The in-coupling grating 1005 may include three subgratings: a first in-coupling subgrating 1005_1, a second in-coupling subgrating 1005_2, and a third in-coupling subgrating 1005_3. The out-coupling grating 1010 may include three subgratings: a first out-coupling subgrating 1010_1, a second out-coupling subgrating 1010_2, and a third out-coupling subgrating 1010_3, which are one-to-one corresponding to the first in-coupling subgrating 1005_1, the second in-coupling subgrating 1005_2, and the third in-coupling subgrating 1005_3.

The light source assembly 205 may emit an image light from a light source (e.g., a display) towards the in-coupling grating 1005. The image light may include rays corresponding to different portions of the FOV of the display. For example, as shown in FIG. 10A, an angular range encompassed by rays 1020 of the image light may correspond to a left portion of the FOV of the display, and an angular range encompassed by rays 1030 of the image light may correspond to a center portion of the FOV of the display, and an angular range encompassed by rays 1040 of the image light may correspond to a right portion of the FOV of the display. In some embodiments, the image light may be a linearly polarized light. In some embodiments, the image light may be other than a linearly polarized light, and optical elements (e.g., a linear polarizer, or a quarter-wave plate, etc.) may be arranged between the light source assembly 205 and the waveguide 1000 to convert the image light emitted from the light source assembly 205 to be a linearly polarized image light to be incident onto the in-coupling grating 1005.

A display frame of the display in the light source assembly 205 may be divided in three subframes for sequential transmission of rays corresponding to different portions of the FOV of the display, thereby realizing sequential transmission of different portions of the FOV of the display. At a $1^{st}$ subframe, referring to FIG. 10A and FIG. 10B, the first in-coupling subgrating 1005_1 and the first out-coupling subgrating 1010_1 may be switched to a diffraction state (or an ON state), while the remaining subgratings may be all switched to a non-diffraction state (or an OFF state). Thus, the rays in the angular range encompassed by the rays 1020 may be coupled into a TIR path in the waveguide 1000 via the first in-coupling subgrating 1005_1, and decoupled out of the waveguide 1000 via the first out-coupling subgrating 1010_1 into an angular range encompassed by rays 1020' to be viewed by the eye 265, while the rays in the angular range compassed by the rays 1030 and the rays in the angular range compassed by the rays 1040 may be not coupled into the waveguide 1000. The angular range encompassed by the rays 1020' may correspond to the left portion of the FOV.

At a $2^{nd}$ subframe, referring to FIG. 10A and FIG. 10C, the second in-coupling subgrating 1005_2 and the second out-coupling subgrating 1010_2 may be switched to a diffraction state (or an ON state), while the remaining subgratings may be all switched to a non-diffraction state (or an OFF state). Thus, the rays in the angular range compassed by the rays 1030 may be coupled into a TIR path in the waveguide 1000 via the second in-coupling subgrating 1005_2, and decoupled out of the waveguide 1000 via the second out-coupling subgrating 1010_2 into an angular range encompassed by rays 1030' to be viewed by the eye 265, while the rays in the angular range compassed by the rays 1020 and the rays in the angular range compassed by the rays 1040 may be not coupled into the waveguide 1000. The angular range encompassed by the rays 1030' may correspond to the central portion of the FOV.

At a $3^{rd}$ subframe, referring to FIG. 10A and FIG. 10D, the third in-coupling subgrating 1005_3 and the third out-coupling subgrating 1010_3 may be switched to a diffraction state (or an ON state), while the remaining subgratings may be all switched to a non-diffraction state (or an OFF state). Thus, the rays in the angular range compassed by the rays 1040 may be coupled into a TIR path in the waveguide 1000 via the third in-coupling subgrating 1005_3, and decoupled out of the waveguide 1000 via the third out-coupling subgrating 1010_3 into an angular range of rays 1040' to be viewed by the eye 265, while the rays in the angular range compassed by the rays 1020 and the rays in the angular range compassed by the rays 1030 may be not coupled into the waveguide 1000. The angular range encompassed by the rays 1040' may correspond to the right portion of the FOV.

Thus, through sequentially switching the pair of the first in-coupling subgrating 1005_1 and the first out-coupling subgrating 1010_1, the pair of the second in-coupling subgrating 1005_2 and the second out-coupling subgrating 1010_2, and the pair of the third in-coupling subgrating 1005_3 and the third out-coupling subgrating 1010_3 to a diffraction state, a sequential transmitting of different portions of the FOV in a common waveguide may be realized by tiling the FOV. Further, switching of the subgratings in different subframes may eliminate crosstalk caused by the spatial overlapping between the neighboring subgratings. In some embodiments, the in-coupling grating 1005 and the out-coupling grating 1010 each may include two subgratings that are optimized for sequentially transmitting the right and left portions of the FOV of the display.

It is to be noted that, FIG. 10A shows a single light source assembly 205 emitting image lights corresponding to the entire FOV, which is for illustrative purposes and is not intended to limit the scope of the present disclosure. In some embodiments, a plurality of light source assemblies may be used, each of which emit image lights corresponding to a portion of the entire FOV provided by the waveguide display assembly. For example, three light source assemblies may be used, which emit image lights corresponding to a left portion, a center portion and a right portion of the entire FOV, respectively. In some embodiments, the emitted image lights corresponding to the left portion and the center portion of the entire FOV may be partially overlapped, and the image lights corresponding to the right portion and the center portion of the entire FOV may be partially overlapped, such that a continuous FOV may be introduced into the waveguide from the in-coupling element 1005.

It is to be noted that, FIG. 10A shows both the in-coupling grating 1005 and the out-coupling grating 1010 include a plurality of disclosed switchable gratings, which is for illustrative purposes and is not intended to limit the scope of the present disclosure. In some embodiments, one of the in-coupling grating 1005 and the out-coupling grating 1010 may include a plurality of disclosed switchable gratings, while the other may include one or more non-switchable gratings. For example, different portions of the FOV may be introduced into the waveguide from the non-switchable in-coupling grating 1005. The out-coupling grating 1010 may include three out-coupling subgratings, and a display frame may include three sub-frames. During each subframe, one subgrating may be switched to the diffraction state to decouple the image lights corresponding to a predetermined portion of the FOV out of the waveguide 1000, while the remain subgratings may be switched to the non-diffraction state to suppress the crosstalk.

Figure 10E:
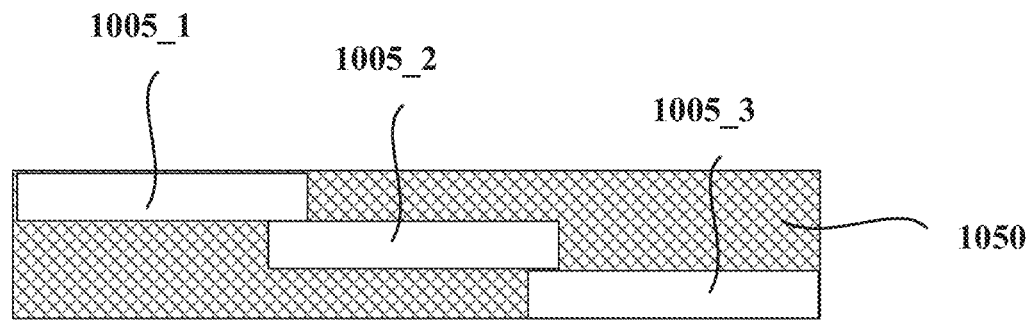
FIG. 10E illustrates a schematic diagram of an overlapping configuration of subgratings included in the waveguide in FIG. 10A, according to an embodiment of the disclosure.
Figure 10F:
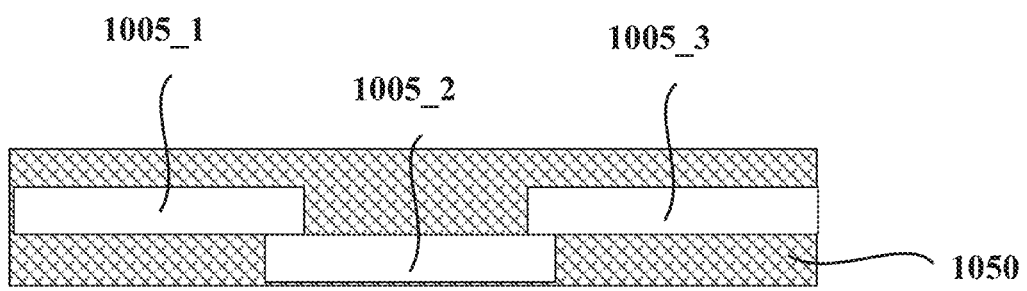
FIG. 10F illustrates a schematic diagram of an overlapping configuration of subgratings included in the waveguide in FIG. 10A, according to another embodiment of the disclosure.

FIGS. 10E-10F illustrate schematic diagrams of overlapping configurations of the in-coupling subgratings included in the waveguide 1000 in FIG. 10A. In some embodiments, one or more in-coupling subgratings may be disposed at different planes, such that neighboring in-coupling subgratings may be partially overlapped. The space around the in-coupling subgratings may be filled with an index-matching material. In one embodiment, as shown in FIG. 10E, each of the in-coupling subgratings 1005_1, 1005_2 and 1005_3 may be disposed at a different plane, such that the neighboring in-coupling subgratings may be partially overlapped. A space around the in-coupling subgratings may be filled with an index-matching material 1050, such that light reflections may be suppressed in the space. In one embodiment, as shown in FIG. 10F, the first in-coupling subgrating 1005_1 and the third in-coupling subgrating 1005_3 may be disposed at the same plane, while the second in-coupling subgrating 1005_2 may be disposed at a different plane, such that the neighboring in-coupling subgratings may be partially overlapped. The overlapping configurations of the out-coupling subgratings included in the waveguide 1000 in FIG. 10A may be similar to that of the in-coupling subgratings, and the details are not repeated here.

Figure 11A:
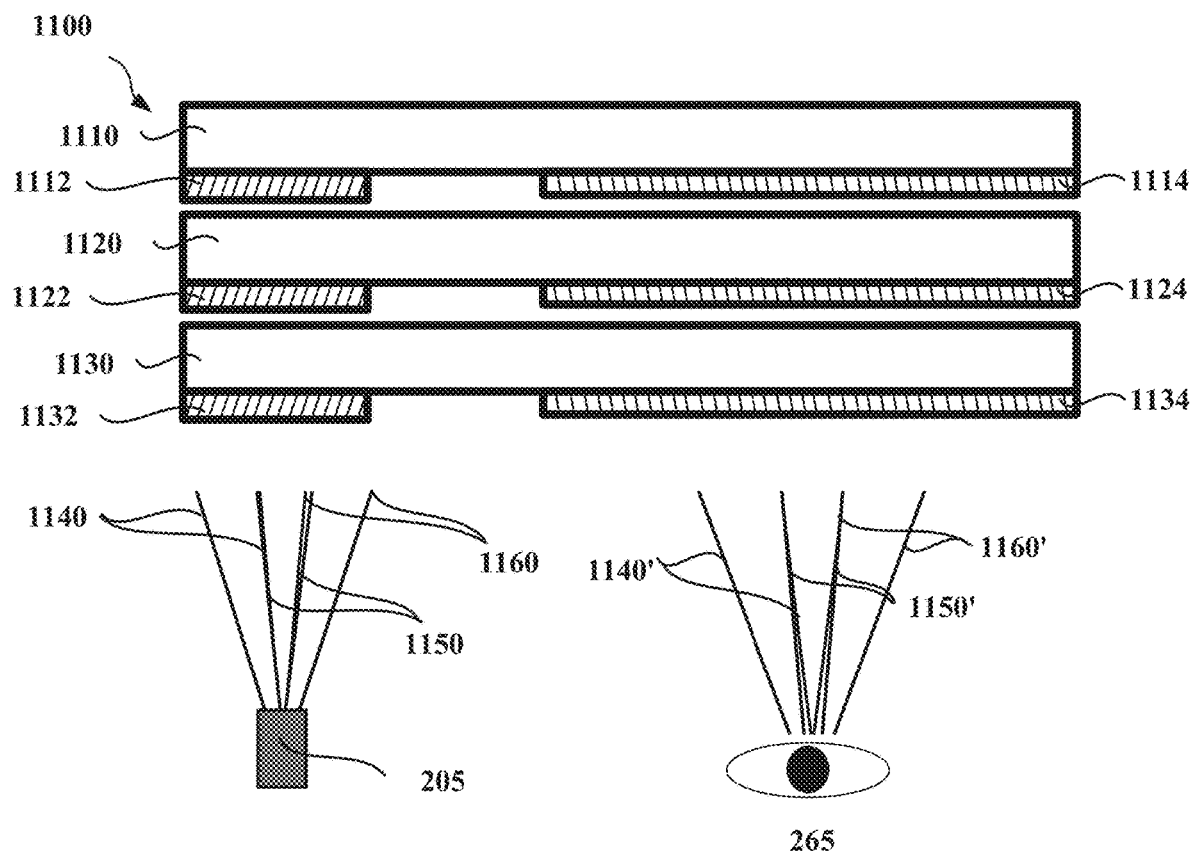
FIG. 11A illustrates a schematic diagram of a stack of waveguides, according to an embodiment of the disclosure.
Figure 11B:
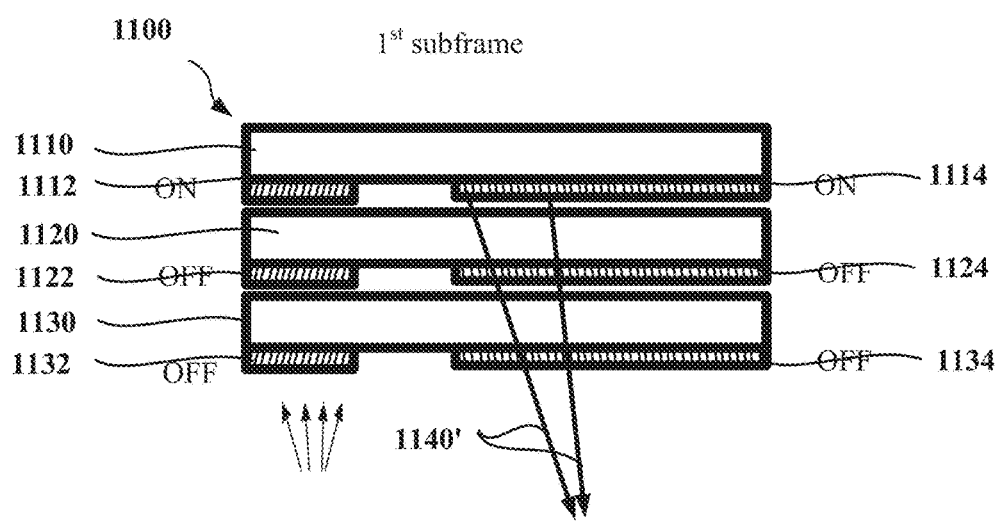
FIGS. 11B-11D illustrate an operation scheme of the stack of waveguides in FIG. 11A to deliver different portions of FOV in a time-multiplexing manner, according to an embodiment of the disclosure.
Figure 11C:
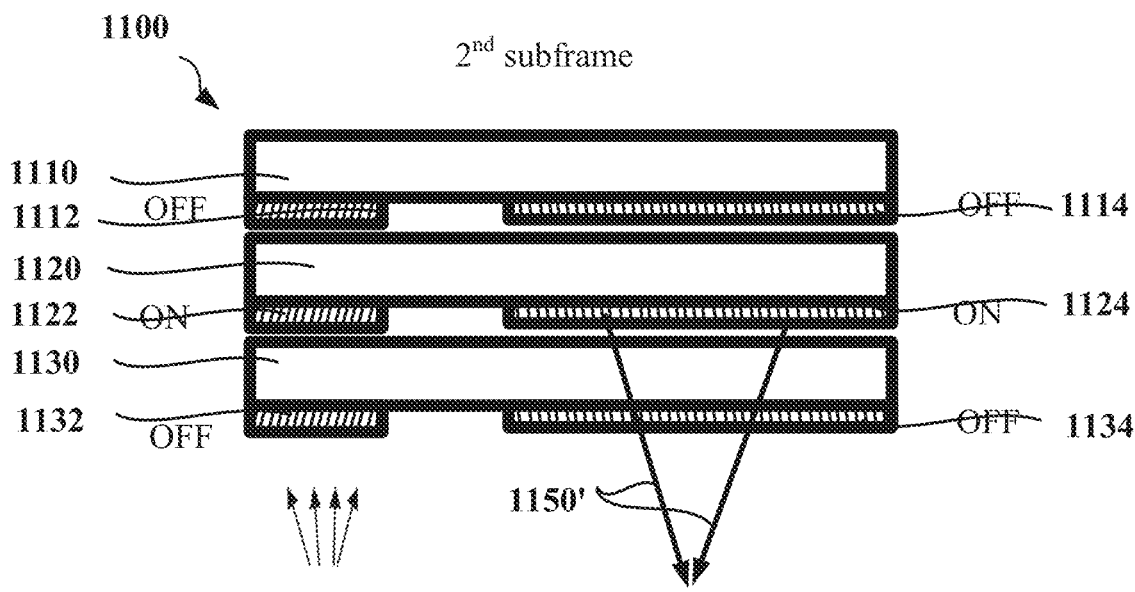
Figure 11D:
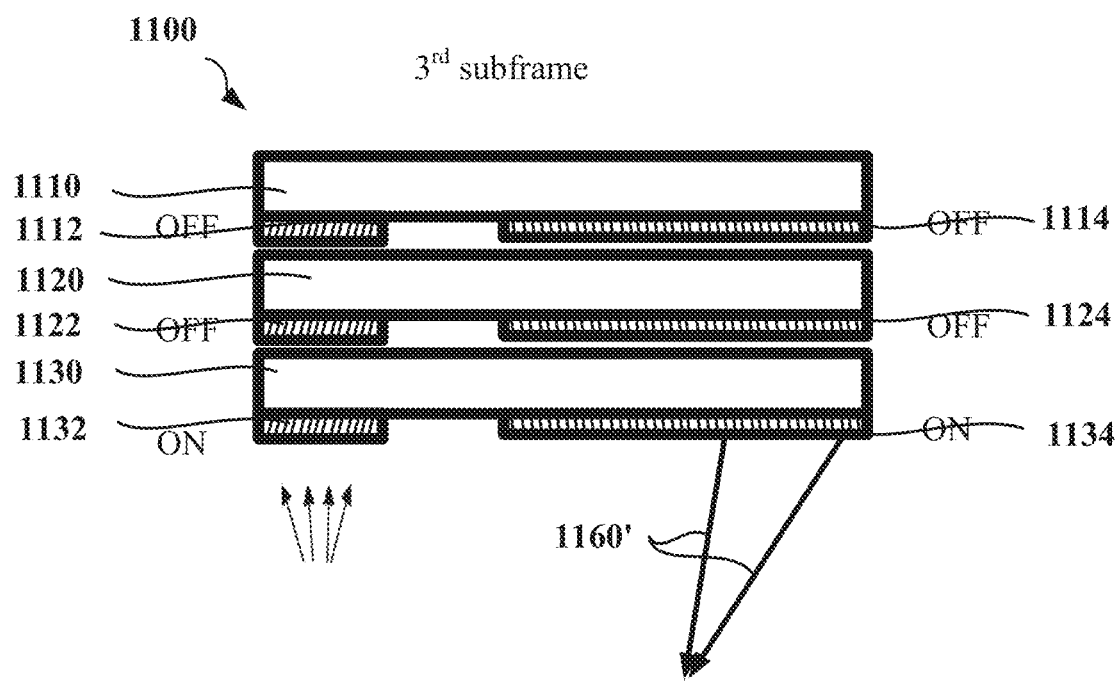

FIGS. 11A-11D illustrate schematic diagrams of time-multiplexing of different portions of FOV delivered by a stack of waveguides. FIG. 11A illustrates a schematic diagram of a stack 1100 of waveguides, and FIGS. 11B-11D illustrate an operation scheme of the stack 1100 in FIG. 11A to deliver different portions of FOV in a time-multiplexing manner. The stack 1100 of waveguides may be an embodiment of the waveguide 210 in FIGS. 2A-2B. The similarities between FIG. 10A and FIG. 11A are not explained, while certain differences may be explained. As shown in FIG. 11A, the stack 1100 may include a plurality of waveguides stacked together, for example, three waveguides 1110, 1120 and 1130. The waveguide 1110 may include an in-coupling grating 1112 and an out-coupling grating 1114, the waveguide 1120 may include an in-coupling grating 1122 and an out-coupling grating 1124, and the waveguide 1130 may include an in-coupling grating 1132 and an out-coupling grating 1134. To ensure that a wave guiding can take place in each waveguide, the three waveguides 1110, 1120 and 1130 may be separated by air gaps. In some embodiments, the air gaps between the waveguides 1110, 1120 and 1130 may be filled with a material (e.g., a liquid glue) having a refractive index lower than that of the waveguides. At least one of the in-coupling gratings and the out-coupling gratings may include any one of the disclosed switchable gratings. The in-coupling gratings and the out-coupling gratings may be disposed at a first surface and/or a second surface of the respective waveguides. For discussion purposes, in FIG. 11A, all the in-coupling gratings and the out-coupling gratings in the stack 1100 may be the disclosed switchable gratings, and disposed at the second surface of the respective waveguides.

The light source assembly 205 may emit an image light from a light source (e.g., a display) towards the stack 1100, where the image light may include rays corresponding to different portions of the FOV of the display. For example, in FIG. 11A, an angular range encompassed by rays 1140 may correspond to a left portion of the FOV of the display, an angular range encompassed by rays 1150 correspond to a center portion of the FOV of the display, and an angular range encompassed by rays 1160 may correspond to a right portion of the FOV of the display. The image light emitted from the light source assembly 205 may be a linearly polarized light or converted to a linearly polarized light by some optical elements arranged between the light source assembly 205 and the stack 1100.

A display frame may be divided in three subframes for sequential transmission of the rays corresponding to different portions of the FOV. At a $1^{st}$ subframe, referring to FIG. 11A and FIG. 11B, the in-coupling grating 1112 and the out-coupling grating 1114 at the waveguide 1110 may be switched to a diffraction state (or an ON state), while the in-coupling grating 1122 and the out-coupling grating 1124 at the waveguide 1120, as well as, the in-coupling grating 1132 and the out-coupling grating 1134 at the waveguide 1130 may be switched to a non-diffraction state (or an OFF state). Thus, the rays in the angular range encompassed by the rays 1140 may be coupled into a TIR path in the waveguide 1110 via the in-coupling grating 1112, and decoupled out of the waveguide 1110 via the out-coupling grating 1114 into an angular range encompassed by rays 1140' to be viewed by the eye 265, while the rays in the angular range encompassed by the rays 1150 and the rays in the angular range encompassed by the rays 1160 may be not coupled into any of the waveguides 1110, 1120 and 1130. The angular range encompassed by the rays 1140' may correspond to the left portion of the FOV. That is, the left portion of the FOV may be replicated at the eye-box located at the exit pupil of the eye 265.

At a $2^{nd}$ subframe, referring to FIG. 11A and FIG. 11C, the in-coupling grating 1122 and the out-coupling grating 1124 at the waveguide 1120 may be switched to a diffraction state (or an ON state), while the in-coupling grating 1112 and the out-coupling grating 1114 at the waveguide 1110, as well as, the in-coupling grating 1132 and the out-coupling grating 1134 at the waveguide 1130 may be all switched to a non-diffraction state (or an OFF state). Thus, the rays in the angular range encompassed by the rays 1150 may be coupled into a TIR path in the waveguide 1120 via the in-coupling grating 1122, and decoupled out of the waveguide 1120 via the out-coupling grating 1124 into an angular range encompassed by rays 1150' to be viewed by the eye 265, while the rays in the angular range encompassed by the rays 1140 and the rays in the angular range encompassed by the rays 1160 may be not coupled into any of the waveguides 1110, 1120 and 1130. The angular range encompassed by the rays 1150' may correspond to the central portion of the FOV. That is, the central portion of the FOV may be replicated at the eye-box located at the exit pupil of the eye 265.

At a $3^{rd}$ subframe, referring to FIG. 11A and FIG. 11D, the in-coupling grating 1132 and the out-coupling grating 1134 at the waveguide 1130 may be switched to a diffraction state (or an ON state), while the in-coupling grating 1112 and the out-coupling grating 1114 at the waveguide 1110, as well as, the in-coupling grating 1122 and the out-coupling grating 1124 at the waveguide 1120 may be all switched to a non-diffraction state (or an OFF state). Thus, only the rays in the angular range encompassed by the rays 1160 may be coupled into a TIR path in the waveguide 1130 via the in-coupling grating 1132, and decoupled out of the waveguide 1130 via the out-coupling grating 1134 into an angular range encompassed by the rays 1160' to be viewed by the eye 265, while the rays in the angular range encompassed by the rays 1140 and the rays in the angular range encompassed by the rays 1150 may be not coupled into any of the waveguides 1110, 1120 and 1130. The angular range encompassed by the rays 1160' may correspond to the right portion of the FOV. That is, the right portion of the FOV may be replicated at the eye-box located at the exit pupil of the eye 265.

Thus, through sequentially switching the pairs of the in-coupling grating and the out-coupling grating at the respective waveguides in the stack 1100 to a diffraction state while switching the remaining in-coupling gratings and out-coupling gratings in the stack 1100 to a non-diffraction state, a sequential transmitting of the left, central and right portions of the FOV may be realized. The in-coupling gratings and out-coupling gratings in the stack 1100 may be designed, such that the left, central, and right portions of FOV may be transmitted partially overlapped to provide a continuous FOV delivered by entire frame. Further, switching of the pairs of the in-coupling grating and the out-coupling grating at the respective waveguides in different subframes may eliminate crosstalk caused by the spatial overlapping between different portions of FOV. In some embodiments, the FOV may be divided in two portions, for example, left and right portions, and the same principle may be used for separate transmission of two portions of FOV.

Figure 15:
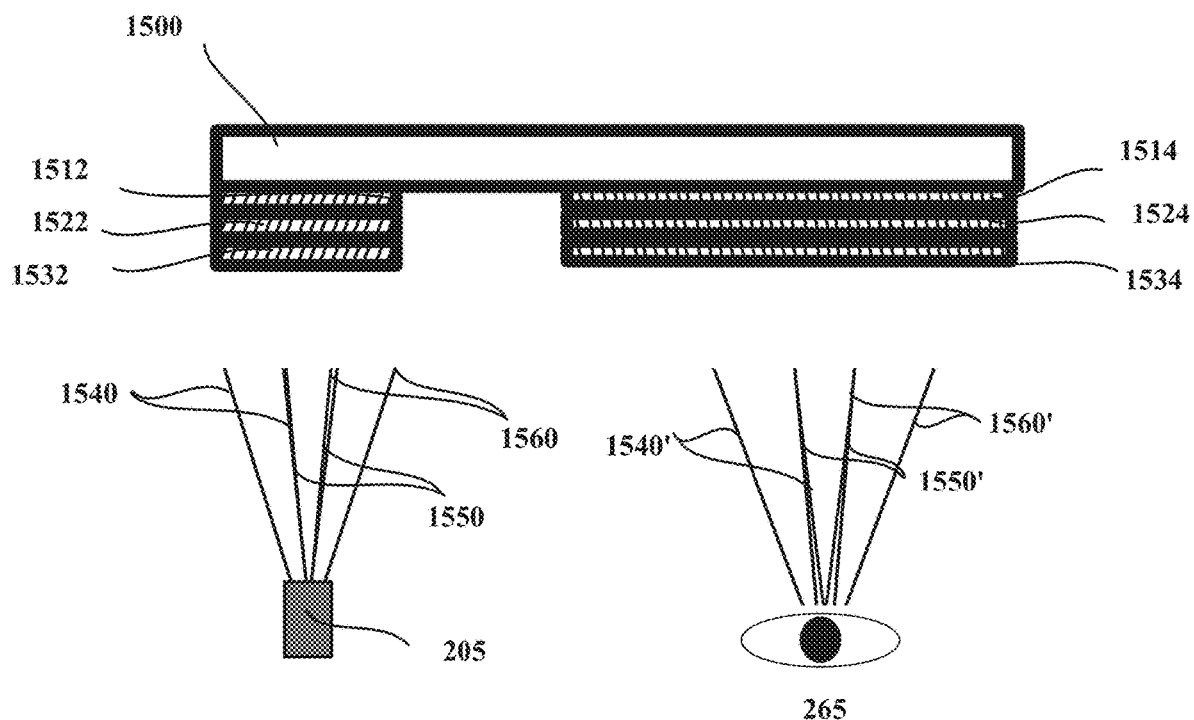
FIG. 15 illustrate a schematic diagram of a waveguide of delivering different portions of FOV in a time-multiplexing manner, according to another embodiment of the disclosure.

In some embodiments, instead of disposing the in-coupling gratings and the out-coupling gratings at the respective waveguides in the stack 1100, the in-coupling gratings 1112, 1122, and 1132 may be stacked and attached to a common (e.g., a single) waveguide, and the out-coupling gratings 1114, 1124, and 1134 may be stacked and attached to the common waveguide, as FIG. 15 shows. FIG. 15 illustrate a schematic diagram of a waveguide 1500 of delivering different portions of FOV in a time-multiplexing manner, according to another embodiment of the disclosure. The similarities between FIG. 11A and FIG. 15 are not repeated, while certain differences may be explained. As shown in FIG. 15, a plurality of in-coupling gratings 1512, 1522 and 1532 may be disposed at a first surface or a second surface of the waveguide 1500, and a plurality of out-coupling gratings 1514, 1524 and 1534 may be disposed at the first surface or the second surface of the waveguide 1500. The plurality of in-coupling gratings 1512, 1522 and 1532 and the plurality of out-coupling gratings 1514, 1524 and 1534 may be disposed at the same surface or different surfaces of the waveguide 1500. The operation scheme of the in-coupling gratings 1512, 1522 and 1532 and the out-coupling gratings 1514, 1524 and 1534 to realize a time-sequential transmitting of the left, central and right portions of the FOV may be similar to that shown in FIGS. 11B-11D, and the details are not repeated here.

Figure 12A:
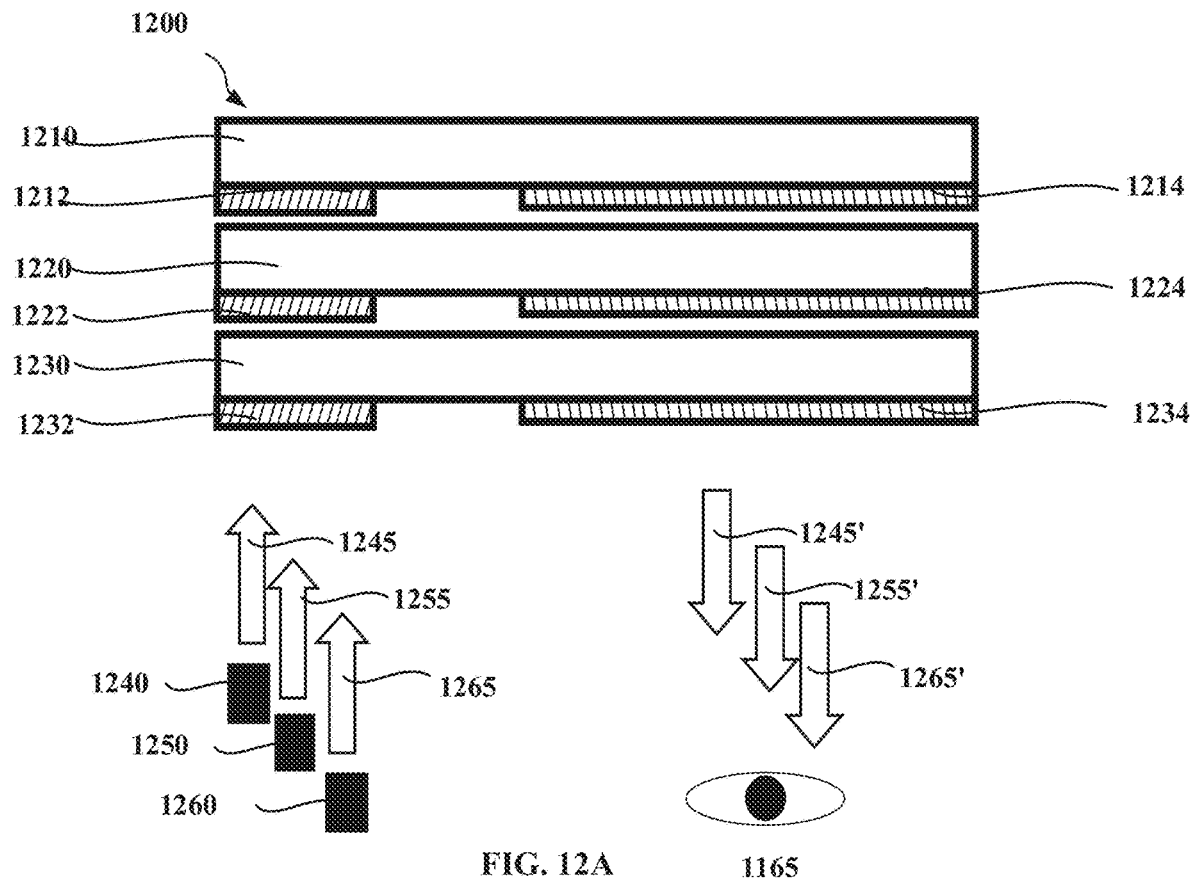
FIG. 12A illustrates a schematic diagram of a stack of waveguides, according to another embodiment of the disclosure.
Figure 12B:
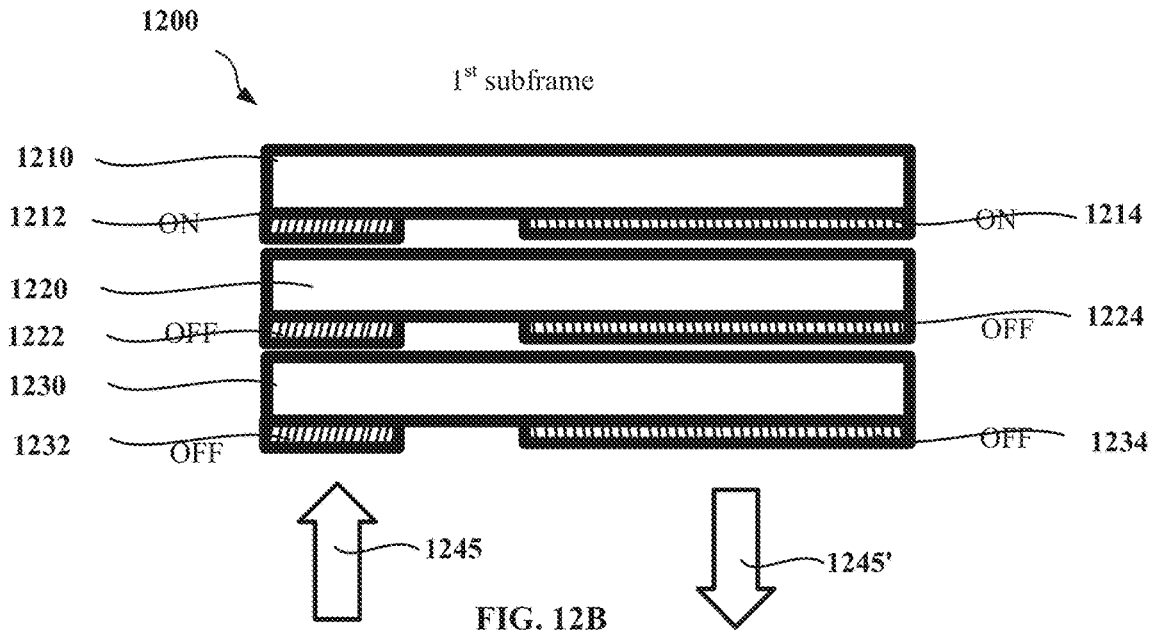
FIGS. 12B-12D illustrate an operation scheme of the stack of waveguides in FIG. 12A to deliver single-color images of different colors in a time-multiplexing manner, according to an embodiment of the disclosure.
Figure 12C:
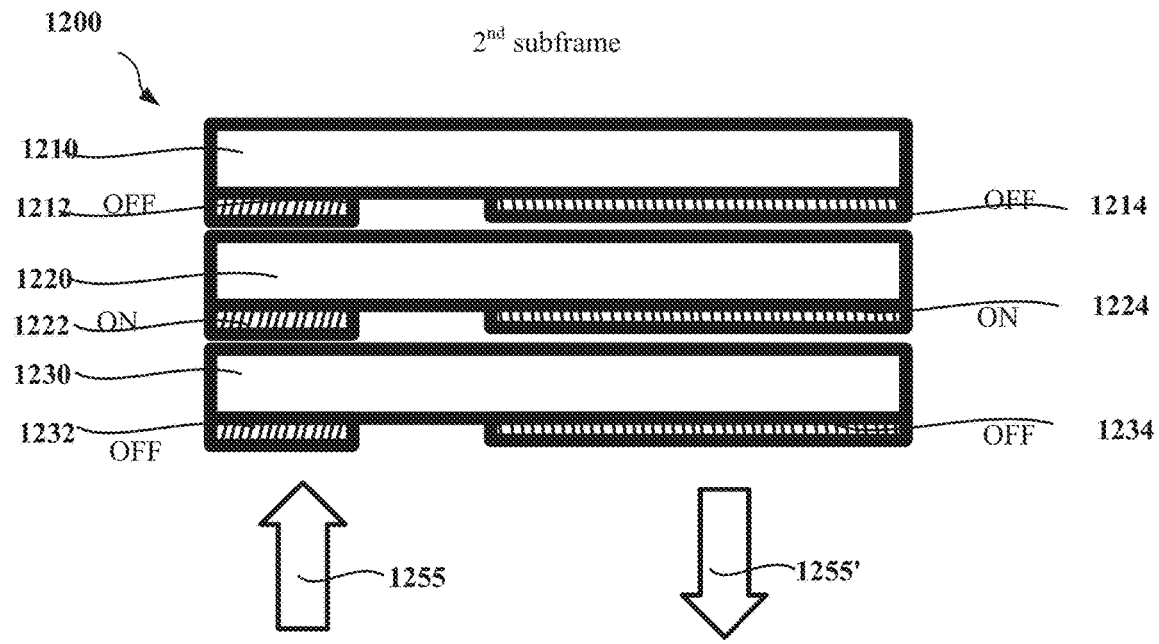
Figure 12D:
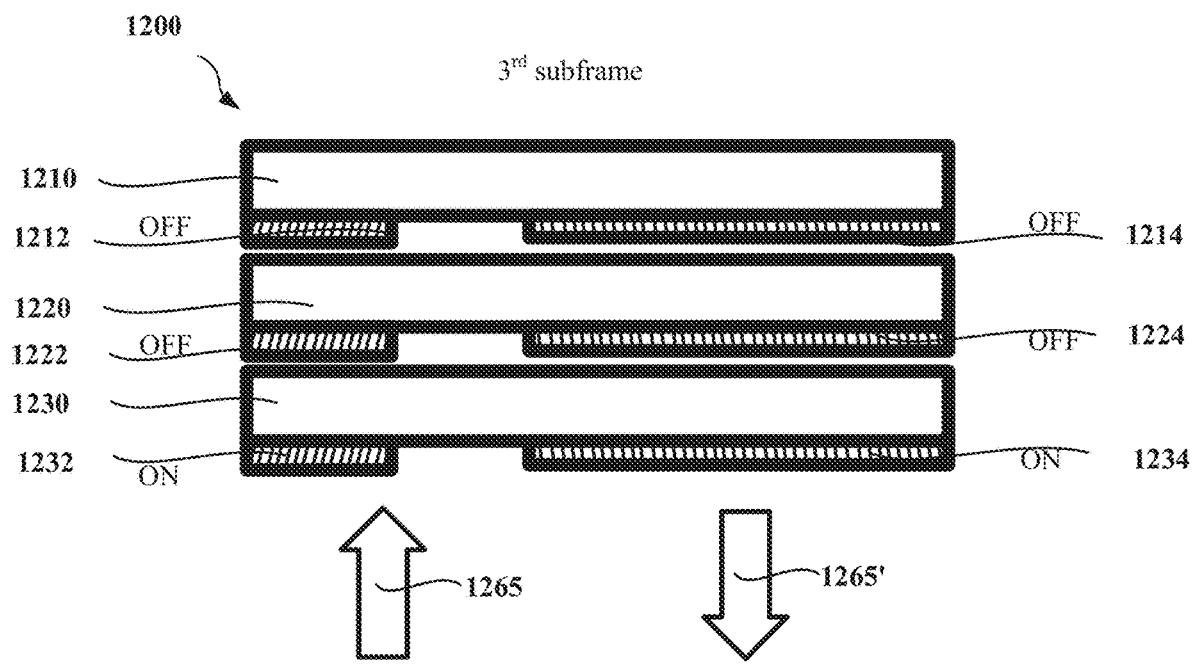

FIG. 12A illustrates a schematic diagram of a stack 1200 of waveguides, according to another embodiment of the disclosure, and FIGS. 12B-12D illustrates an operation scheme of the stack 1200 of waveguides in FIG. 12A to deliver single-color images of different colors in a time-multiplexing manner. The stack 1200 of waveguides may be similar to the stack 1100 of waveguides in FIG. 11A, and the details are not repeated here. The stack 1200 of waveguides may receive image lights from a plurality of source assemblies, for example, three source assemblies 1240, 1250 and 1260. Each source assembly may emit a monochromatic image light of a specific wavelength band corresponding to a primary color (e.g., red, green, or blue). For example, the source assemblies 1240, 1250 and 1260 may emit a monochromatic image light 1245, 1255 and 1265 of a specific wavelength band corresponding to a first primary color (e.g., red), a second primary color (e.g., green) and a third primary color (e.g., blue), respectively. The source assemblies 1240, 1250 and 1260 may be configured to sequentially emit the corresponding image lights in accordance with instructions from a controller. The image lights emitted from the source assemblies 1240, 1250 and 1260 each may be a linearly polarized light or converted to a linearly polarized light by some optical elements arranged between the source assemblies and the stack 1200.

The waveguide 1210 may include an in-coupling grating 1212 and an out-coupling grating 1214 both designed for a wavelength band corresponding to the first primary color (e.g., red), the waveguide 1220 may include an in-coupling grating 1222 and an out-coupling grating 1224 both designed for a wavelength band corresponding to the second primary color (e.g., green), and the waveguide 1230 may include an in-coupling grating 1232 and an out-coupling grating 1234 both designed for a wavelength band corresponding to the third primary color (e.g., blue). At least one of the in-coupling gratings 1212, 1222 and 1232 and the out-coupling gratings 1214, 1224 and 1234 may include any one of the disclosed polarization sensitive switchable gratings. For discussion purposes, all the coupling gratings 1212, 1222 and 1232 and the out-coupling gratings 1214, 1224 and 1234 may be the disclosed polarization sensitive switchable gratings.

A display frame may be divided in three subframes for sequential transmission of the image lights 1240, 1250 and 1260. At a $1^{st}$ subframe, referring to FIG. 12A and FIG. 12B, the image light 1245 (e.g., red light) may be emitted by the source assembly 1240 towards the stack 1200, and the image light 1255 (e.g., green light) and 1265 (e.g., blue light) may not be emitted from the corresponding source assemblies. The in-coupling grating 1212 and the out-coupling grating 1214 at the waveguide 1210 may be switched to a diffraction state (or an ON state), while the in-coupling grating 1222 and the out-coupling grating 1224 at the waveguide 1220, as well as, the in-coupling grating 1232 and the out-coupling grating 1234 at the waveguide 1230 may be all switched to a non-diffraction state (or an OFF state). Thus, the image light 1245 (e.g., red light) may be coupled into a TIR path in the waveguide 1210 via the in-coupling grating 1212, and decoupled out of the waveguide 1210 via the out-coupling grating 1214 into an image light 1245' (e.g., red light) to be viewed by the eye 265. That is, a single-color image (e.g. red color image) may be viewed by the eye 265.

At a $2^{nd}$ subframe, referring to FIG. 12A and FIG. 12C, the image light 1255 (e.g., green light) may be emitted by the source assembly 1250 towards the stack 1200, and the image light 1245 (e.g., red light) and 1265 (e.g., blue light) may be not emitted from the corresponding source assemblies. The in-coupling grating 1222 and the out-coupling grating 1224 at the waveguide 1220 may be switched to a diffraction state (or an ON state), while the in-coupling grating 1212 and the out-coupling grating 1214 at the waveguide 1210, as well as, the in-coupling grating 1232 and the out-coupling grating 1234 at the waveguide 1230 may be all switched to a non-diffraction state (or an OFF state). Thus, the image light 1255 (e.g., green light) may be coupled into a TIR path in the waveguide 1220 via the in-coupling grating 1222, and decoupled out of the waveguide 1220 via the out-coupling grating 1224 into an image light 1255' (e.g., green light) to be viewed by the eye 265. That is, a single-color image (e.g. green color image) may be viewed by the eye 265.

At a $3^{rd}$ subframe, referring to FIG. 12A and FIG. 12D, the image light 1265 (e.g., blue light) may be emitted by the source assembly 1260 towards the stack 1200, and the image light 1245 (e.g., red light) and 1255 (e.g., green light) may be not emitted from the corresponding source assemblies. The in-coupling grating 1232 and the out-coupling grating 1234 at the waveguide 1230 may be switched to a diffraction state (or an ON state), while the in-coupling grating 1212 and the out-coupling grating 1214 at the waveguide 1210, as well as, the in-coupling grating 1222 and the out-coupling grating 1224 at the waveguide 1220 may be all switched to a non-diffraction state (or an OFF state). Thus, the image light 1265 (e.g., blue light) may be coupled into a TIR path in the waveguide 1230 via the in-coupling grating 1232, and decoupled out of the waveguide 1230 via the out-coupling grating 1234 into an image light 1265' (e.g., blue light) to be viewed by the eye 265. That is, a single-color image (e.g. blue color image) may be viewed by the eye 265.

Thus, through sequentially emitting the monochromatic image lights 1245, 1255 and 1265, and sequentially switching the corresponding pairs of the in-coupling grating and the out-coupling grating to a diffraction state, a sequential transmitting of image lights in different colors (e.g., red, green, blue) may be realized. That is, a sequential transmitting of single-color images in different colors may be realized. A final image may be viewed by the eye 265 as a polychromatic image. Further, a time-multiplexing that is realized by using the disclosed switchable gratings may eliminate crosstalk in the stack 1200 and, thus, improve the image performance of the waveguide display assembly including the stack 1200. In some embodiments, the source assemblies 1240, 1250 and 1260 may remain emitting the respective image lights even when the corresponding pairs of the in-coupling grating and the out-coupling grating is switched to a non-diffraction state, through which the control may be simplified, while the power consumption may be increased.

In some embodiments, instead of disposing the in-coupling gratings and the out-coupling gratings at the respective waveguides in the stack 1200, the in-coupling gratings 1212, 1222, and 1232 may be stacked and attached to a common (e.g., a single) waveguide, and the out-coupling gratings 1214, 1224, and 1234 may be stacked and attached to the common waveguide, and a similar structure may be referred to FIG. 11E. The stack of the in-coupling gratings and the stack of the out-coupling gratings each may be disposed at the first surface or the second surface of the common waveguide. The operation scheme of the in-coupling gratings 1212, 1222, and 1232 and the out-coupling gratings 1214, 1224, and 1234 to realize a time-sequential transmitting of the image lights in different colors may be similar to that shown in FIGS. 12B-12D, and the details are not repeated here.

The embodiments in FIGS. 12A-12D may be effective for monochromatic image light. For the color images, the image light of different colors may be spatially and/or temporally multiplexed. The number of waveguides in the stack may be reduced to two. For separate transmission of colors, one waveguide may be configured for red/green and the other for the green/blue colors.

It is to be noted that, FIG. 12A shows the in-coupling gratings and the out-coupling grating each is the disclosed switchable gratings, which is for illustrative purposes and is not intended to limit the scope of the present disclosure. In some embodiments, the in-coupling gratings each may be the disclosed switchable grating, while the out-coupling gratings each may be a non-switchable grating. In some embodiments, the out-coupling gratings each may be the disclosed switchable grating, while the in-coupling gratings each may be a non-switchable grating. For example, RGB colors may be introduced from separate projectors by non-switchable in-coupling gratings. A display frame may include three subframes. In each subframe, only the projector emitting one of the RGB colors may be turned on and the out-coupling grating corresponding to the one of the RGB colors may be configured to be at the diffraction state to deliver the image light of the one of the RGB colors, while the remaining projectors may be turned off and the remaining out-coupling gratings may be configured to be at the non-diffraction state to suppress the crosstalk.

The present disclosure also provides a method for a waveguide display assembly to deliver a plurality of light fields of an image light emitted from a light source assembly in a time-multiplexing manner. The method may include during a first time period, in-coupling, by a first in-coupling grating, a first plurality of image lights corresponding to a first light field of a plurality of light fields into a first waveguide via diffraction, and decoupling, by a first out-coupling grating, the first plurality of image lights out of the first waveguide towards an eye-box of the optical device via the diffraction. The method may include during a second time period, in-coupling, by a second in-coupling grating, a second plurality of image lights corresponding to a second light field of the plurality of light fields into a second waveguide via diffraction, and decoupling, by a second out-coupling grating, the second plurality of image lights out of the second waveguide towards an eye-box of the optical device via the diffraction. A light field may correspond to a predetermined portion of a field of view (FOV) of a single-color image, a predetermined portion of the FOV of a full-color image, or a single-color image of a predetermined color. The method may further include during a third time period, in-coupling, by a third in-coupling grating, a third plurality of image lights corresponding to a third light field of the plurality of light fields into a third waveguide via diffraction, and decoupling, by a third out-coupling grating, the third plurality of image lights out of the third waveguide towards an eye-box of the optical device via the diffraction.

For discussion purposes, FIG. 13 illustrates a flow chart 1300 of a method of a waveguide display assembly for delivering different portions of FOV in a time-multiplexing manner, according to an embodiment of the disclosure. The waveguide display assembly may be an embodiment of the waveguide display assemblies 200 and 250 in FIG. 2A-2B. The waveguide display assembly may include at least one disclosed switchable diffractive optical element.

As shown in FIG. 13, the method may include: during a first time period, in-coupling, by a first in-coupling element, a first plurality of rays emitted from a light source assembly into a first waveguide via diffraction, and decoupling, by a first out-coupling element, the first plurality of rays out of the first waveguide into a first angular range of rays towards an eye-box via diffraction (S1310). An angular range of the first plurality of rays emitted from the light source assembly may correspond to a first portion of a FOV provided by the light source assembly. The first angular range of the rays decoupled out of the first waveguide may correspond to the first portion of the FOV provided by the light source assembly.

The method may further include: during a second time period, in-coupling, by a second in-coupling element, a second plurality of rays emitted from the light source assembly into a second waveguide via diffraction, and decoupling, by a second out-coupling element, the second plurality of rays out of the second waveguide into a second angular range of rays towards an eye-box via diffraction (S1320). An angular range of the second plurality of rays emitted from the light source assembly may correspond to a second portion of the FOV provided by the light source assembly. The second angular range of the rays decoupled out of the second waveguide may correspond to the second portion of the FOV provided by the light source assembly.

In some embodiments, the light source assembly may include a source that is a display, the first time period and the second time period may be a first sub-frame and a second sub-frame of a display frame of the display, respectively. In some embodiments, the first and second waveguides may be a same waveguide (referred to as a common waveguide), where the common waveguide may have a first surface facing the light source assembly and an opposing second surface. In some embodiments, the first and second in-coupling elements may be tiled at the first or second surface of the common waveguide, and the first and second out-coupling elements may be tiled at the first or second surface of the common waveguide. In some embodiments, the first and second in-coupling elements may be stacked and attached to the first or second surface of the common waveguide, and the first and second out-coupling elements may be stacked and attached to the first or second surface of the common waveguide.

In some embodiments, the first and second waveguides may be individual waveguides that are separated by a low index material, where each waveguide may have a first surface facing the light source assembly and an opposing second surface. The in-coupling elements of the respective waveguides may be disposed at the first or second surface of the respective waveguides, and the out-coupling elements of the respective waveguides may be disposed at the first or second surface of the respective waveguides.

In some embodiments, the method may further include: during a third time period, in-coupling, by a third in-coupling element, a third plurality of rays emitted from the light source assembly into a third waveguide via diffraction, and decoupling, by a third out-coupling element, the third plurality of rays out of the third waveguide into a third angular range of rays towards an eye-box via diffraction. An angular range of the third plurality of rays emitted from the light source assembly may correspond to a third portion of the FOV provided by the light source assembly. The third angular range of the rays decoupled out of the third waveguide may correspond to the third portion of the FOV provided by the light source assembly.

For discussion purposes, FIG. 14 illustrates a flow chart 1400 of a method of a waveguide display assembly for delivering single-color images of different colors in a time-multiplexing manner, according to an embodiment of the disclosure. The waveguide display assembly may be an embodiment of the waveguide display assemblies 200 and 250 in FIG. 2A-2B. The waveguide display assembly may include at least one disclosed switchable diffractive optical element.

As shown in FIG. 14, the method may include: during a first time period, in-coupling, by a first in-coupling element, an image light of a first color emitted from a first light source assembly into a first waveguide via diffraction, and decoupling, by a first out-coupling element, the image light of the first color out of the first waveguide towards an eye-box via diffraction (S1410). The method may include: during a second time period, in-coupling, by a second in-coupling element, an image light of a second color emitted from a second light source assembly into a second waveguide via diffraction, and decoupling, by a second out-coupling element, the image light of the second color out of the second waveguide towards the eye-box via diffraction (S1420).

In some embodiments, the first and second light source assemblies may be individual light source assemblies. Each of the first and second light source assemblies may include a source that is a display, and the first time period and the second time period may be a first sub-frame and a second sub-frame of a display frame of the display, respectively. In some embodiments, the first and second light source assemblies may be a same common light source assembly, which is controlled to sequentially emit the image light of the first color and the image light of the second color. In some embodiments, the image light of the first color and the image light of the second color may be monochromatic lights at wavelength bands corresponding to different primary colors. The first and second waveguides may be individual waveguides that are separated by a low index material. Each waveguide may have a first surface facing the light source assembly and an opposing second surface. The in-coupling elements of the respective waveguides may be disposed at the first or second surface of the respective waveguides, and the out-coupling elements of the respective waveguides may be disposed at the first or second surface of the respective waveguides.

In some embodiments, the method may further include: during a third time period, in-coupling, by a third in-coupling element, an image light of a third color emitted from a third light source assembly into a third waveguide via diffraction, and decoupling, by a third out-coupling element, the image light of the third color out of the third waveguide towards the eye-box via diffraction.

It is to be noted that, the disclosed methods for spatial- and/or time-multiplexing of different colors and/or different portions of FOV based on the disclosed switchable gratings may be combined to deliver full-color images with wide FOV, all of which are within the scope of the present disclosure. For example, the waveguide stack 1100 or in FIG. 11A or the waveguide 1500 in FIG. 15 may also be used for transmitting full-color images with large FOV, where the one or more waveguides are configured to deliver full-color images with different portions of FOV in a time-multiplexing manner. To realize the transmitting of full-color images with large FOV via the waveguides in a time-multiplexing manner, each of the in-coupling gratings and the out-coupling gratings in each waveguide may include a plurality of subgratings for delivering different colors (e.g., red, green, and blue colors) corresponding to different portions of the FOV.

For example, to sequentially deliver full-color image lights corresponding to predetermined portions of the FOV in a time-multiplexing manner via the waveguide stack 1100 in FIG. 11A or the waveguide 1500 in FIG. 15, each of the in-coupling gratings 1112, 1122 and 1132 in FIG. 11A or 1512, 1522, 1532 in FIG. 15 may include a plurality of switchable in-coupling subgratings, and each of the out-coupling gratings 1114, 1124 and 1134 in FIG. 11A or 1514, 1524, 1534 in FIG. 15 may include a plurality of switchable out-coupling subgratings. The in-coupling gratings 1112, 1122 and 1132 in FIG. 11A or 1512, 1522, 1532 in FIG. 15 may be an in-coupling grating stack, and the out-coupling gratings 1114, 1124 and 1134 in FIG. 11A or 1514, 1524, 1534 in FIG. 15 may be an out-coupling grating stack. Provided that X number of subgratings are designed for delivering FOV and Y number of subgratings are designed for delivering single-color images forming a full-color image (e.g., RGB colors), the total amount of subgratings included in each of the in-coupling and out-coupling grating stacks may be $X*Y$, where X and Y are positive integers and $X \geq 2$ and $Y \geq 2$. For example, each of the in-coupling gratings 1112, 1122 and 1132 in FIG. 11A or 1512, 1522, 1532 in FIG. 15 serving for delivering ⅓ portion of FOV (X=3) may be split in 3 subgratings (Y=3) to deliver a corresponding portion of FOV in red, green and blue colors. For the same purpose, the out-coupling gratings 1114, 1124 and 1134 in FIG. 11A or 1514, 1524, 1534 in FIG. 15 serving for delivering ⅓ portion of FOV (X=3) may be split in 3 subgratings (Y=3) to deliver a corresponding portion of FOV in red (R), green (G) and blue (B) colors. The total amount of the in-coupling subgratings may be equal to the total amount of the out-coupling subgratings and may be designed as $X*Y=3*3=9$. In some embodiments, the corresponding subgratings from the in-coupling and out-coupling grating stacks may be activated in separate subframes (e.g., 9 subframes) to suppress the crosstalk.

In each subframe, one pair of switchable in-coupling and out-coupling subgratings may be configured to be in the diffraction state to transmit a single-color image corresponding to a predetermined portion of the FOV to the eye, while the remaining pairs of the in-coupling subgratings and out-coupling subgratings may be configured to be in the non-diffraction state. Thus, during the entire display frame, single-color images corresponding to different portions of the FOV may be sequentially transmitted to the eye in the time-multiplexing manner. For example, a single-color image of red color corresponding to the left portion of FOV, a single-color image of green color corresponding to the left portion of FOV, a single-color image of blue color corresponding to the left portion of FOV, a single-color image of red color corresponding to the center portion of FOV, a single-color image of green color corresponding to the center portion of FOV, a single-color image of blue color corresponding to the center portion of FOV, a single-color image of red color corresponding to the right portion of FOV, a single-color image of green color corresponding to the right portion of FOV, and a single-color image of blue color corresponding to the right portion of FOV may be sequentially transmitted to the eye in the time-multiplexing manner. In some embodiments, the number of subframes may be reduced provided some subgratings in the waveguide stack 1100 (for example for different colors) or the waveguide 1500 are highly selective so that a crosstalk between them may be negligible.

Similarly, the waveguide 1000 in FIG. 10A may also be used for transmitting full-color images with large FOV, where the waveguide 1000 is configured to deliver full-color images with different portions of FOV in a time-multiplexing manner. To realize the transmitting of full-color images with large FOV via the waveguides in a time-multiplexing manner, each of the in-coupling sub-gratings 1005_1, 1005_2 and 1005_3 may further include a plurality of in-coupling tertiary gratings and each of the out-coupling sub-gratings 1010_1, 1010_2 and 1010_3 may further include a plurality of out-coupling tertiary gratings for delivering different colors (e.g., red, green, and blue colors). The respective tertiary gratings may be stacked or tiled at a surface of the waveguide 1000, and the details are not repeated here. The number of the in-coupling tertiary gratings and out-coupling tertiary gratings may be determined in a same way as that of the in-coupling subgratings and out-coupling subgratings included in the waveguide stack 1100 in FIG. 11A, and the details are not repeated here. The operation scheme of the pairs of switchable in-coupling and out-coupling tertiary gratings in the waveguide 1000 may be similar to that of the pairs of switchable in-coupling and out-coupling subgratings in the waveguide stack 1100 in FIG. 11A, and the details are not repeated here.

In the above discussion, to sequentially deliver full-color image lights corresponding to predetermined portions of the FOV in a time-multiplexing manner, each in-coupling grating may include three switchable in-coupling subgratings, and each out-coupling grating may include three switchable out-coupling subgratings, which is for illustrative purposes, and is not intended to limit the scope of the present disclosure. In some embodiments, to multiplex colors and tile FOVs at the same time, each in-coupling grating (sub-grating) may include N number of in-coupling subgratings (tertiary gratings), and each out-coupling grating (sub-grating) may include N number of out-coupling subgratings (tertiary gratings), N is a positive integer and $N \geq 2$. In some embodiments, $N \geq 3$. That is, an in-coupling subgrating (tertiary grating) and a corresponding out-coupling subgrating (tertiary grating) may form a pair, a disclosed waveguide or waveguide stack may include N pairs. During respective time periods, respective pairs of the N pairs may be sequentially configured to be in the diffraction state to transmit respective light fields of a plurality of light fields, and the remaining pairs of the N pairs may be configured to be in the non-diffraction state. The plurality of light fields may correspond to single-color images of different colors, different portions of FOV of single-color images or different portions of FOV of full-color images.

Further, the disclosed methods and disclosed waveguide display assemblies for spatial- and/or time-multiplexing of different colors and/or different portions of FOV may also be realized by other switchable gratings, such as geometric phase gratings based on active LCs, metasurface/LC gratings etc., all of which are within the scope of the present disclosure.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical device, comprising:
    a light source assembly configured to generate an image light representing a virtual image; and
    a waveguide coupled with an in-coupling element and an out-coupling element disposed at opposite surfaces of the waveguide, wherein the waveguide coupled with the in-coupling element and the out-coupling element is configured to transmit a plurality of light fields of the image light to an eye-box of the optical device, in a time-multiplexing manner,
    wherein each of the in-coupling element and the out-coupling element includes a switchable diffractive optical element, and
    wherein the switchable diffractive optical element is disposed at a surface of the waveguide, and includes two or more diffractive gratings disposed within a volume of an index-matching material with two neighboring diffractive gratings partially overlapping at opposing end portions.

2. The optical device of claim 1, wherein each light field of the plurality of light fields corresponds to the entire virtual image having a portion of a field of view (FOV) provided by the light source assembly, and wherein the virtual image is a single-color image.

3. The optical device of claim 1, wherein each light field of the plurality of light fields corresponds to the entire virtual image having a portion of a field of view (FOV) provided by the light source assembly, and wherein the virtual image is a full-color image.

4. The optical device of claim 1, wherein the virtual image is a full-color image, and the plurality of light fields correspond to single-color images of different colors.

5. The optical device of claim 1, wherein the each of the two or more diffractive gratings in the switchable diffractive optical element is switchable between a diffraction state and a non-diffraction state via an applied external electric field.

6. The optical device of claim 1, wherein each of the two or more diffractive gratings is a one-dimensional diffraction grating.

7. The optical device of claim 1, wherein:
    during a plurality of time periods, the two or more diffractive gratings are configured to be sequentially switched to operate in a diffraction state to transmit respective light fields, each light field corresponding to the entire virtual image having a portion of a field of view (FOV) provided by the light source assembly, wherein neighboring portions of the FOV partially overlap with one another, and
    during each time period, one or more of the two or more diffractive gratings included in each of the in-coupling element and the out-coupling element are configured to be switched to operate in the diffraction state to transmit a light field corresponding to a portion of the FOV and the remaining one or more diffractive gratings in each of the in-coupling element and the out-coupling element are configured to be switched to operate in a non-diffraction state.

8. The optical device of claim 1, wherein:
    the waveguide includes a plurality of waveguides stacked together, the switchable diffractive optical element includes a plurality of switchable diffractive optical elements coupled with of the waveguides.

9. The optical device of claim 1, wherein
    the two or more diffractive gratings include a first diffractive grating, a second diffractive grating, and a third diffractive grating, and
    at least two of the first diffractive grating, the second diffractive grating, and the third diffractive are disposed at different planes within the volume of the index-matching material.

10. The optical device of claim 9, wherein
    the first diffractive grating, the second diffractive grating, and the third diffractive grating are disposed at three different planes within the volume of the index-matching material, and two end portions of the second diffractive grating overlap with an end portion of the first diffractive grating and an end portion of the third diffractive grating.

11. The optical device of claim 9, wherein
the first diffractive grating and the third diffractive grating are disposed at a same first plane within the volume of the index-matching material, and the second diffractive grating is disposed at a second plane within the volume of the index-matching material, the second plane being different from the first plane, and
two end portions of the second diffractive grating overlap with an end portion of the first diffractive grating and an end portion of the third diffractive grating.

12. The optical device of claim 1, wherein
the light source assembly provides a field of view (FOV) for the virtual image,
each of the plurality of light fields corresponds to the entire virtual image having a portion of the FOV,
the waveguide coupled with the in-coupling element and the out-coupling element is configured to transmit, during a first time period, a first light field corresponding to the entire virtual image having a first portion of the FOV to the eye-box, and
the waveguide coupled with the in-coupling element and the out-coupling element is configured to transmit, during a second time period, a second light field corresponding to the entire virtual image having a second portion of the FOV to the eye-box, the first portion of the FOV and the second portion of the FOV being partially overlapping with one another.

13. The optical device of claim 1, wherein the two or more diffractive gratings included in the in-coupling element are sequentially switchable at different time periods to operate at a diffraction state to in-couple different light fields into the waveguide, each light field corresponding to the entire virtual image having different portions of a field of view (FOV) provided by the light source assembly, and wherein two neighboring portions of the FOV partially overlap with one another.

14. A method, comprising:
during a first time period, in-coupling, by a first in-coupling grating, a first light field of a plurality of light fields of an image light into a waveguide via diffraction, and decoupling, by a first out-coupling grating, the first light field out of the waveguide towards an eye-box of the optical device via the diffraction; and
during a second time period, in-coupling, by a second in-coupling grating, a second light field of the plurality of light fields into the waveguide via diffraction, and decoupling, by a second out-coupling grating, the second light field out of the waveguide towards the eye-box via the diffraction,
wherein the first in-coupling grating and the second in-coupling grating are disposed at a same surface of the waveguide, and are disposed within a volume of an index-matching material with the first in-coupling grating and the second in-coupling grating partially overlapping at opposing end portions.

15. The method of claim 14, wherein the image light represents a single-color virtual image, the first light field corresponds to the entire single-color virtual image having a first portion of a field of view (FOV) provided by a light source assembly that emits the image light, the second light field corresponds to the entire single-color virtual image having a second portion of the FOV, and the first portion of the FOV partially overlaps with the second portion of the FOV.

16. The method of claim 14, wherein the image light represents a full-color virtual image, the first light field corresponds to the entire full-color virtual image having a first portion of a field of view (FOV) provided by a light source assembly that emits the image light, the second light field corresponds to the entire full-color virtual image having a second portion of the FOV, and the first portion of the FOV partially overlaps with the second portion of the FOV.

17. The method of claim 14, wherein the image light represents a full-color virtual image, the first light field corresponds to a first single-color virtual image of a first color, and the second light field corresponds to a second single-color virtual image of a second color.

18. The method of claim 14, further comprising:
during a third time period, in-coupling, by a third in-coupling grating, a third light field of the plurality of light fields into the waveguide via diffraction, and decoupling, by a third out-coupling grating, the third light field out of the waveguide towards the eye-box via the diffraction,
wherein the third in-coupling grating is disposed within the same volume of index-matching material with the first in-coupling grating and the second in-coupling grating,
wherein two neighboring in-coupling gratings from the first in-coupling grating, the second in-coupling grating, and the third in-coupling grating are disposed at different planes, and
wherein the two neighboring in-coupling gratings partially overlap at neighboring end portions.

19. The method of claim 14, wherein
the image light represents a virtual image,
each of the light fields of the image light represents the entire virtual image having a portion of a field of view (FOV) provided by a light source assembly that emits the image light,
the first light field represents the entire virtual image having a first portion of the FOV, and
the second light field represents the entire virtual image having a second portion of the FOV.

* * * * *